United States Patent
Fujinami

(10) Patent No.: US 7,456,905 B2
(45) Date of Patent: Nov. 25, 2008

(54) COMMUNICATION APPARATUS AND METHOD, RECORDING MEDIUM, AND PROGRAM

(75) Inventor: Yasushi Fujinami, Tokyo (JP)

(73) Assignee: Sony Corporation (JP)

( * ) Notice: Subject to any disclaimer, the term of this patent is extended or adjusted under 35 U.S.C. 154(b) by 1672 days.

(21) Appl. No.: 10/323,180

(22) Filed: Dec. 19, 2002

(65) Prior Publication Data

US 2003/0123840 A1    Jul. 3, 2003

(30) Foreign Application Priority Data

Dec. 25, 2001    (JP) ................ P2001-392362

(51) Int. Cl.
*H04N 5/268* (2006.01)
*H04N 7/00* (2006.01)

(52) U.S. Cl. .................. 348/706; 348/552

(58) Field of Classification Search .......... 348/705, 348/706, 552, 553–555, 722; 725/141, 133, 725/153; 719/319; 386/35, 124, 40; *H04N 5/268, H04N 7/00, 11/00, 5/46, 5/44, 3/27, 5/222*
See application file for complete search history.

(56) References Cited

U.S. PATENT DOCUMENTS 6,825,858 B2 *  11/2004  Sato .................. 348/552
7,372,821 B2 *   5/2008  Sato et al. ........... 725/141

\* cited by examiner

*Primary Examiner*—Sherrie Hsia
(74) *Attorney, Agent, or Firm*—Lerner, David, Littenberg, Krumholz & Mentlik, LLP

(57) ABSTRACT

When a DVD player is to be set as a source apparatus and a television receiver is to be set as a sink apparatus, for example, a user directs a remote control toward the DVD player and continues to depress a select button. The user then directs the remote control toward the television receiver while continuing to depress the select button. The user then releases the depression of the select button of the remote control directed toward the television receiver. As a result of the intuitive operations described above, the DVD player is designated as the source apparatus and the television receiver is designated as the sink apparatus.

12 Claims, 27 Drawing Sheets

FIG. 8

| | USER | REMOTE CONTROL 4 | DVD PLAYER 1-1 | DVD PLAYER 1-2 | RECEIVER 2-1 | RECEIVER 2-2 |
|---|---|---|---|---|---|---|
| 1 | PRESS "SELECT BUTTON" WITH REMOTE CONTROL DIRECTED TO DVD PLAYER 1-1 AND DVD PLAYER 1-2 | | | | | |
| 2 | | TRANSMIT "PRESSING OF SELECT BUTTON" COMMAND | | | | |
| 3 | | | RECEIVE REMOTE CONTOL SIGNAL ("PRESSING OF SELECT BUTTON" COMMAND) | SAME AS LEFT | | |
| 4 | | | DETERMINE THAT THE SESSION IS NOT CANCELLED (BY "SOURCE DESIGNATION CANCELING INFORMATION") | SAME AS LEFT | | |
| 5 | | | LIGHT GREEN LED | SAME AS LEFT | | |
| 6 | | | BROADCAST "SOURCE-DESIGNATED CANDIDATE INFORMATION" | SAME AS LEFT | | |
| 7 | | | RECEIVE "SOURCE-DESIGNATED CANDIDATE INFORMATION" BROADCAST BY DVD PLAYER 1-1 | SAME AS LEFT | SAME AS LEFT | SAME AS LEFT |
| 8 | | | RECEIVE "SOURCE-DESIGNATED CANDIDATE INFORMATION" BROADCAST BY DVD PLAYER 1-2 | SAME AS LEFT | SAME AS LEFT | SAME AS LEFT |
| 9 | | | WAIT FOR CERTAIN TIME | SAME AS LEFT | | |
| 10 | | | DETERMINE THAT SESSION IS NOT ESTABLISHED BECAUSE "SOURCE-DESIGNATED CANDIDATE INFORMATION" IS RECEIVED FROM ANOTHER APPARATUS AND REMOTE CONTROL ID AND SESSION ID ARE IDENTICAL | SAME AS LEFT | | |
| 11 | | | TURN OFF GREEN LED, GENERATE TWO BEEPS, AND BLINK RED LED FOR CERTAIN TIME | SAME AS LEFT | | |
| 12 | | | BROADCAST "SOURCE DESIGNATION CANCELING INFORMATION" | SAME AS LEFT | | |
| 13 | | | RECEIVE "SOURCE DESIGNATION CANCELING INFORMATION" BROADCAST BY DVD PLAYER 1-1 AND DVD PLAYER 1-2 | SAME AS LEFT | SAME AS LEFT | SAME AS LEFT |
| 14 | | | RECORD CANCELLATION | SAME AS LEFT | | |
| 15 | REALIZE FAILURE FROM TWO BEEPS AND BLINKING OF RED LED | | | | | |

WHEN TWO APPARATUS RECEIVE REMOTE CONTROL SIGNAL AT TIME OF SELECTING SOURCE APPARATUS

FIG. 9

| | USER | REMOTE CONTROL 4 | DVD PLAYER 1-1 | DVD PLAYER 1-2 | RECEIVER 2-1 | RECEIVER 2-2 |
|---|---|---|---|---|---|---|
| 1 | PRESS "SELECT BUTTON" WITH REMOTE CONTROL DIRECTED TO DVD PLAYER 1-1 | | | | | |
| 2 | | TRANSMIT "PRESSING OF SELECT BUTTON" COMMAND | | | | |
| 3 | | | RECEIVE REMOTE CONTROL SIGNAL ("PRESSING OF SELECT BUTTON" COMMAND) | | | |
| 4 | | | DETERMINE THAT THE SESSION IS NOT CANCELLED (BY "SOURCE DESIGNATION CANCELING INFORMATION") | | | |
| 5 | | | LIGHT GREEN LED | | | |
| 6 | | | BROADCAST "SOURCE-DESIGNATED CANDIDATE INFORMATION" | | | |
| 7 | | | RECEIVE "SOURCE-DESIGNATED CANDIDATE INFORMATION" BROADCAST BY DVD PLAYER 1-1 | SAME AS LEFT | SAME AS LEFT | SAME AS LEFT |
| 8 | | | WAIT FOR CERTAIN TIME | | | |
| 9 | | | DETERMINE THAT DVD PLAYER 1-1 IS ESTABLISHED AS SOURCE BECAUSE NO "SOURCE-DESIGNATED CANDIDATE INFORMATION" IS RECEIVED FROM ANOTHER APPARATUS | | | |
| 10 | | | GENERATE ONE BEEP, AND BLINK GREEN LED | | | |
| 11 | | | BROADCAST "SOURCE DETERMINING INFORMATION" | | | |
| 12 | | | RECEIVE "SOURCE DETERMINING INFORMATION" BROADCAST BY DVD PLAYER 1-1 | SAME AS LEFT | SAME AS LEFT | SAME AS LEFT |
| 13 | | | RECORD ESTABLISHMENT OF DVD PLAYER 1-1 AS SOURCE | | | |
| 14 | REALIZE SELECTION OF DVD PLAYER 1-1 FROM ONE BEEP AND BLINKING OF GREEN LED | | | | | |
| 15 | ON SECOND THOUGHT, DECIDE TO USE DVD PLAYER 1-2 | | | | | |
| 16 | RELEASE "SELECT BUTTON" WITH REMOTE CONTROL DIRECTED TO WHERE NO APPARATUS ARE PLACED | | | | | |
| 17 | | TRANSMIT "RELEASING OF SELECT BUTTON" COMMAND, WHICH IS NOT RECEIVED | | | | |

SOURCE APPARATUS SELECTION. THOUGH SELECTION SUCCEEDS, USER CANCELS SELECTION ON SECOND THOUGHT.

FIG. 10

| | USER | REMOTE CONTROL 4 | DVD PLAYER 1-1 | DVD PLAYER 1-2 | RECEIVER 2-1 | RECEIVER 2-2 |
|---|---|---|---|---|---|---|
| 1 | PRESS "SELECT BUTTON" WITH REMOTE CONTROL DIRECTED TO DVD PLAYER 1-2 | | | | | |
| 2 | | TRANSMIT "PRESSING OF SELECT BUTTON" COMMAND | | | | |
| 3 | | | | RECEIVE REMOTE CONTROL SIGNAL ("PRESSING OF SELECT BUTTON" COMMAND) | | |
| 4 | | | | DETERMINE THAT THE SESSION IS NOT CANCELLED (BY "SOURCE DESIGNATION CANCELING INFORMATION") | | |
| 5 | | | | LIGHT GREEN LED | | |
| 6 | | | | BROADCAST "SOURCE-DESIGNATED CANDIDATE INFORMATION" | | |
| 7 | | | SAME AS RIGHT | RECEIVE "SOURCE-DESIGNATED CANDIDATE INFORMATION" BROADCAST BY DVD PLAYER 1-2 | SAME AS LEFT | SAME AS LEFT |
| 8 | | | | WAIT FOR CERTAIN TIME | | |
| 9 | | | | DETERMINE THAT DVD PLAYER 1-2 IS ESTABLISHED AS SOURCE BECAUSE NO "SOURCE-DESIGNATED CANDIDATE INFORMATION" IS RECEIVED FROM ANOTHER APPARATUS | | |
| 10 | | | | GENERATE ONE BEEP, AND BLINK GREEN LED | | |
| 11 | | | | BROADCAST "SOURCE DETERMINING INFORMATION" | | |
| 12 | | | SAME AS RIGHT | RECEIVE "SOURCE DETERMINING INFORMATION" BROADCAST BY DVD PLAYER 1-2 | SAME AS LEFT | SAME AS LEFT |
| 13 | | | COMPARE "SOURCE DETERMINING INFORMATION" PREVIOUSLY TRANSMITTED BY DVD PLAYER 1-1 ITSELF WITH "SOURCE DETERMINING INFORMATION" RECEIVED THIS TIME AND DETERMINE THAT DESIGNATION OF DVD PLAYER 1-1 AS SOURCE IS CANCELLED BECAUSE REMOTE CONTROL ID IS IDENTICAL AND SESSION ID INCLUDED IN INFORMATION TRANSMITTED BY DVD PLAYER 1-2 IS NEWER | | | |
| 14 | | | TURN OFF GREEN LED AND RETURN TO STANDBY STATE | | | |
| 15 | REALIZE SELECTION OF DVD PLAYER 1-2 | | | | | |
| 16 | | "HOLDING OF SELECT BUTTON" COMMAND HAS BEEN TRANSMITTED AND RECEIVED BUT NOT USED BY DVD PLAYER 1-2 | | | | |

SOURCE APPARATUS SELECTION. THIS TIME DVD PLAYER 1-2 IS SELECTED.

FIG. 11

| # | USER | REMOTE CONTROL 4 | DVD PLAYER 1-1 | DVD PLAYER 1-2 | RECEIVER 2-1 | RECEIVER 2-2 |
|---|------|------------------|----------------|----------------|--------------|--------------|
| 1 | DIRECT REMOTE CONTROL TO RECEIVER 2-1 (WHILE HOLDING DOWN "SELECT BUTTON") | | | | | |
| 2 | | "HOLDING OF SELECT BUTTON" COMMAND HAS BEEN TRANSMITTED | | | | |
| 3 | | | | | RECEIVE REMOTE CONTROL SIGNAL ("HOLDING OF SELECT BUTTON" COMMAND) | |
| 4 | | | | | DETERMINE THAT THE SESSION IS NOT CANCELLED (BY "SOURCE DESIGNATION CANCELING INFORMATION") | |
| 5 | | | | | DETERMINE THAT MISMATCH OF SPECIFICATIONS OF SIGNAL TO BE OUTPUTTED HAS NOT BEEN ALREADY CONFIRMED IN THE SESSION | |
| 6 | | | | | DETERMINE THAT "SOURCE DETERMINING INFORMATION" HAS ALREADY BEEN RECEIVED IN THE SESSION | |
| 7 | | | | | DETERMINE THAT RECEIVER 2-1 IS DESIGNATED AS SYNC CANDIDATE BECAUSE THREE CONDITIONS ABOVE ARE MET | |
| 8 | | | | | TRANSMIT "INQUIRY ABOUT SPECIFICATIONS OF SIGNAL TO BE OUTPUTTED" TO SOURCE APPARATUS (DVD PLAYER 1-2 IN THIS CASE) | |
| 9 | | | | RECEIVE "INQUIRY ABOUT SPECIFICATIONS OF SIGNAL TO BE OUTPUTTED" | | |
| 10 | | | | RETURN "SPECIFICATIONS" OF SIGNAL TO BE OUTPUTTED | | |
| 11 | | | | | RECEIVE "SPECIFICATIONS OF SIGNAL TO BE OUTPUTTED" | |
| 12 | | | | | WHEN IT IS DETERMINED THAT DATA HAVING RECEIVED SPECIFICATIONS CANNOT BE DISPLAYED, GENERATE TWO BEEPS, BLINK RED LED, AND RECORD THE INFORMATION | |

RECEIVER 2-1 IS INTENDED TO BE SELECTED AS SYNC APPARATUS, BUT RECEIVER 2-1 DOES NOT CONFORM TO SIGNAL SPECIFICATIONS.

FIG. 12

| # | USER | REMOTE CONTROL 4 | DVD PLAYER 1-1 | DVD PLAYER 1-2 | RECEIVER 2-1 | RECEIVER 2-2 |
|---|---|---|---|---|---|---|
| 1 | DIRECT REMOTE CONTROL TO RECEIVER 2-1 (WHILE HOLDING DOWN "SELECT BUTTON") | | | | | |
| 2 | | "HOLDING OF SELECT BUTTON" COMMAND HAS BEEN TRANSMITTED | | | | |
| 3 | | | | | RECEIVE REMOTE CONTROL SIGNAL ("HOLDING OF SELECT BUTTON" COMMAND) | |
| 4 | | | | | DETERMINE THAT THE SESSION IS NOT CANCELLED (BY "SOURCE-DESIGNATION CANCELING INFORMATION") | |
| 5 | | | | | DETERMINE THAT MISMATCH OF SPECIFICATIONS OF SIGNAL TO BE OUTPUTTED HAS NOT BEEN ALREADY CONFIRMED IN THE SESSION | |
| 6 | | | | | DETERMINE THAT "SOURCE DETERMINING INFORMATION" HAS ALREADY BEEN RECEIVED IN THE SESSION | |
| 7 | | | | | DETERMINE THAT RECEIVER 2-1 IS DESIGNATED AS SYNC CANDIDATE BECAUSE THREE CONDITIONS ABOVE ARE MET | |
| 8 | | | | | TRANSMIT "INQUIRY ABOUT SPECIFICATIONS OF SIGNAL TO BE OUTPUTTED" TO SOURCE APPARATUS (DVD PLAYER 1-2 IN THIS CASE) | |
| 9 | | | | RECEIVE "INQUIRY ABOUT SPECIFICATIONS OF SIGNAL TO BE OUTPUTTED" | | |
| 10 | | | | RETURN "SPECIFICATIONS OF SIGNAL TO BE OUTPUTTED" | | |
| 11 | | | | | RECEIVE "SPECIFICATIONS OF SIGNAL TO BE OUTPUTTED" | |
| 12 | | | | | WHEN IT IS DETERMINED THAT DATA HAVING RECEIVED SPECIFICATIONS CAN BE DISPLAYED, GENERATE ONE BEEP AND BLINK GREEN LED | |
| 13 | | | | RECEIVE "SYNC-DESIGNATED CANDIDATE INFORMATION" BROADCAST BY RECEIVER 2-1 | BROADCAST "SYNC-DESIGNATED CANDIDATE INFORMATION" | |
| 14 | | | SAME AS RIGHT | | SAME AS LEFT | SAME AS LEFT |
| 15 | | | | BLINK GREEN LED | | |

RECEIVER 2-1 IS INTENDED TO BE SELECTED AS SYNC APPARATUS.

FIG. 13

| | USER | REMOTE CONTROL 4 | DVD PLAYER 1-1 | DVD PLAYER 1-2 | RECEIVER 2-1 | RECEIVER 2-2 |
|---|---|---|---|---|---|---|
| 1 | | TRANSMIT "HOLDING OF SELECT BUTTON" COMMAND | | | | |
| 2 | | | | | RECEIVE REMOTE CONTROL SIGNAL ("HOLDING OF SELECT BUTTON" COMMAND) | |
| 3 | | | | | BROADCAST "SYNC-DESIGNATED CANDIDATE INFORMATION" | |
| 4 | | | | | BLINK GREEN LED | |
| 5 | | | SAME AS RIGHT | RECEIVE "SYNC-DESIGNATED CANDIDATE INFORMATION" BROADCAST BY RECEIVER 2-1 | SAME AS LEFT | SAME AS LEFT |
| 6 | | | | BLINK GREEN LED | | |
| 7 | | | | | TRANSMIT "PICTURE REQUEST" TO SOURCE APPARATUS (DVD PLAYER 1-2 IN THIS CASE) | |
| 8 | | | | RECEIVE "PICTURE REQUEST" | | |
| 9 | | | | TRANSMIT "PICTURE" | | |
| 10 | | | | | RECEIVE "PICTURE" | |
| 11 | | | | | DISPLAY "PICTURE" | |
| 12 | REALIZE THAT RECEIVER 2-1 IS SYNC CANDIDATE | | | | | |

EACH TIME "HOLDING OF SELECT BUTTON" IS TRANSMITTED FROM REMOTE CONTROL, GREEN LEDS OF SOURCE APPARATUS AND SYNC CANDIDATE APPARATUS BLINK IN SYNCHRONISM WITH EACH OTHER. ALSO PICTURE IS DISPLAYED.

FIG. 14

| | USER | REMOTE CONTROL 4 | DVD PLAYER 1-1 | DVD PLAYER 1-2 | RECEIVER 2-1 | RECEIVER 2-2 |
|---|---|---|---|---|---|---|
| 1 | DECIDE TO USE RECEIVER 2-2 ON SECOND TUOUGHT AND THEN DIRECT REMOTE CONTROL TO RECEIVER 2-2 (WHILE HOLDING DOWN "SELECT BUTTON") | | | | | |
| 2 | | "HOLDING OF SELECT BUTTON" COMMAND HAS BEEN TRANSMITTED | | | | |
| 3 | | | | | | RECEIVE REMOTE CONTROL SIGNAL ("HOLDING OF SELECT BUTTON" COMMAND) |
| 4 | | | | | | DETERMINE THAT THE SESSION IS NOT CANCELLED (BY "SOURCE-DESIGNATION CANCELING INFORMATION") |
| 5 | | | | | | DETERMINE THAT MISMATCH OF SPECIFICATIONS OF SIGNAL TO BE OUTPUTTED HAS NOT BEEN ALREADY CONFIRMED IN THE SESSION |
| 6 | | | | | | DETERMINE THAT "SOURCE DETERMINING INFORMATION" HAS ALREADY BEEN RECEIVED IN THE SESSION |
| 7 | | | | | | DETERMINE THAT RECEIVER 2-2 IS DESIGNATED AS SYNC CANDIDATE BECAUSE THREE CONDITIONS ABOVE ARE MET |
| 8 | | | | | | TRANSMIT "INQUIRY ABOUT SPECIFICATIONS OF SIGNAL TO BE OUTPUTTED" TO SOURCE APPARATUS (DVD PLAYER 1-2 IN THIS CASE) |
| 9 | | | | RECEIVE "INQUIRY ABOUT SPECIFICATIONS OF SIGNAL TO BE OUTPUTTED" | | |
| 10 | | | | RETURN "SPECIFICATIONS OF SIGNAL TO BE OUTPUTTED" | | |
| 11 | | | | | | RECEIVE "SPECIFICATIONS OF SIGNAL TO BE OUTPUTTED" |
| 12 | | | | | | WHEN IT IS DETERMINED THAT DATA HAVING RECEIVED SPECIFICATIONS CAN BE DISPLAYED, GENERATE ONE BEEP AND BLINK GREEN LED |
| 13 | | | | RECEIVE "SYNC-DESIGNATED CANDIDATE INFORMATION" BROADCAST BY RECEIVER 2-2 | | BROADCAST "SYNC-DESIGNATED CANDIDATE INFORMATION" |
| 14 | | | SAME AS RIGHT | | SAME AS LEFT | SAME AS LEFT |
| 15 | | | | BLINK GREEN LED | | |
| 16 | | | | | COMPARE "SYNC-DESIGNATED CANDIDATE INFORMATION" PREVIOUSLY TRANSMITTED BY RECEIVER 2-1 ITSELF WITH "SYNC-DESIGNATED CANDIDATE INFORMATION" RECEIVED THIS TIME, AND DETERMINE THAT DESIGNATION OF RECEIVER 2-1 AS SYNC CANDIDATE IS CANCELLED BECAUSE REMOTE CONTROL ID AND SESSION ID ARE IDENTICAL | |
| 17 | | | | | RETURN TO STANDBY STATE | |

ON SECOND THOUGHT, USER USES RECEIVER 2-2 AS SYNC CANDIDATE. RECEIVER 2-2 RESPONDS. RECEIVER 2-1 DETERMINES THAT RECEIVER 2-1 IS NO LONGER SYNC CANDIDATE.

FIG. 15

| | USER | REMOTE CONTROL 4 | DVD PLAYER 1-1 | DVD PLAYER 1-2 | RECEIVER 2-1 | RECEIVER 2-2 |
|---|---|---|---|---|---|---|
| 1 | | TRANSMIT "HOLDING OF SELECT BUTTON" COMMAND | | | | |
| 2 | | | | | | RECEIVE REMOTE CONTROL SIGNAL ("HOLDING OF SELECT BUTTON" COMMAND) |
| 3 | | | | | | BROADCAST "SYNC-DESIGNATED CANDIDATE INFORMATION" |
| 4 | | | | | | BLINK GREEN LED |
| 5 | | | SAME AS RIGHT | RECEIVE "SYNC-DESIGNATED CANDIDATE INFORMATION" BROADCAST BY RECEIVER 2-2 | SAME AS LEFT | SAME AS LEFT |
| 6 | | | | BLINK GREEN LED | | |
| 7 | | | | | | TRANSMIT "PICTURE REQUEST" TO SOURCE APPARATUS (DVD PLAYER 1-2 IN THIS CASE) |
| 8 | | | | RECEIVE "PICTURE REQUEST" | | |
| 9 | | | | TRANSMIT "PICTURE" | | |
| 10 | | | | | | RECEIVE "PICTURE" |
| 11 | | | | | | DISPLAY "PICTURE" |
| 12 | REALIZE THAT RECEIVER 2-2 IS SYNC CANDIDATE | | | | | |

EACH TIME "HOLDING OF SELECT BUTTON" IS TRANSMITTED FROM REMOTE CONTROL, GREEN LEDS OF SOURCE APPARATUS AND SYNC CANDIDATE APPARATUS BLINK IN SYNCHRONISM WITH EACH OTHER. ALSO PICTURE IS DISPLAYED.

FIG. 16

| # | USER | REMOTE CONTROL 4 | DVD PLAYER 1-1 | DVD PLAYER 1-2 | RECEIVER 2-1 | RECEIVER 2-2 |
|---|------|------------------|----------------|----------------|--------------|--------------|
| 1 | RELEASE SELECT BUTTON WITH REMOTE CONTROL DIRECTED TO RECEIVER 2-2 | | | | | |
| 2 | | TRANSMIT "RELEASING OF SELECT BUTTON" COMMAND | | | | |
| 3 | | | | | | RECEIVE REMOTE CONTROL SIGNAL ("RELEASING OF SELECT BUTTON" COMMAND) |
| 4 | | | | | | BLINK GREEN LED |
| 5 | | | | | | BROADCAST "SYNC DETERMINING INFORMATION" |
| 6 | | | SAME AS RIGHT | RECEIVE "SYNC DETERMINING INFORMATION" BROADCAST BY RECEIVER 2-2 | SAME AS LEFT | SAME AS LEFT |
| 7 | | | | | (RECEIVER 2-1 CAN ALSO CANCEL DESIGNATION OF RECEIVER 2-1 AS SYNC CANDIDATE IN RESPONSE TO "SYNC DETERMINING INFORMATION" IN THIS CASE, CANCELLATION IS PERFORMED IN RESPONSE TO "SYNC-DESIGNATED CANDIDATE INFORMATION".) | |
| 8 | | | | | | RECORD ESTABLISHMENT TO RECEIVER 2-2 AS SYNC APPARATUS |
| 9 | | | | | | TRANSMIT "CONNECTION REQUEST" TO SOURCE APPARATUS (DVD PLAYER 1-2 IN THIS CASE) |
| 10 | | | | RECEIVE "CONNECTION REQUEST" | | |
| 11 | | | | REPLY TO "CONNECTION REQUEST" | | |
| 12 | | | | ESTABLISH CONNECTION | | ESTABLISH CONNECTION |
| 13 | | | | | | GENERATE TWO BEEPS AND BLINK GREEN LED |
| 14 | | | | | | TRANSMIT "SYNCHRONIZATION SIGNAL" TO SOURCE APPARATUS (DVD PLAYER 1-2 IN THIS CASE) |
| 15 | | | | RECEIVE "SYNCHRONIZATION SIGNAL" | | |
| 16 | | | | GENERATE TWO BEEPS AND BLINK GREEN LED | | |
| 17 | | | | | | |
| 18 | REALIZE THAT CONNECTION IS ESTABLISHED | | | | | DISPLAY MESSAGE THAT CONNECTION IS ESTABLISHED |
| 19 | | | | | | PERFORM INITIALIZATION |

ESTABLISHMENT OF CONNECTION

FIG. 17

| | USER | REMOTE CONTROL 4 | DVD PLAYER 1-1 | DVD PLAYER 1-2 | RECEIVER 2-1 | RECEIVER 2-2 |
|---|---|---|---|---|---|---|
| 1 | PRESS PLAY BUTTON OF REMOTE CONTROL WITH REMOTE CONTROL DIRECTED TO DVD PLAYER 1-2 | | | | | |
| 2 | | TRANSMIT "PRESSING OF PLAY BUTTON" COMMAND | | | | |
| 3 | | | | RECEIVE REMOTE CONTROL SIGNAL ("PRESSING OF PLAY BUTTON" COMMAND) | | |
| 4 | | | | START REPRODUCTION AND TRANSMIT READ STREAM TO SYNC APPARATUS (RECEIVER 2-2 IN THIS CASE) | | |
| 5 | | | | | | RECEIVE STREAM |
| 6 | | | | | | DECODE AND DISPLAY RECEIVED STREAM |
| 7 | | | | | | |

INSTRUCTION FOR "REPRODUCTION" IS GIVEN TO DVD PLAYER 1-2

FIG. 18

| | USER | REMOTE CONTROL 4 | DVD PLAYER 1-1 | DVD PLAYER 1-2 | RECEIVER 2-1 | RECEIVER 2-2 |
|---|---|---|---|---|---|---|
| 1 | PRESS STOP BUTTON OF REMOTE CONTROL WITH REMOTE CONTROL DIRECTED TO DVD PLAYER 1-2 | | | | | |
| 2 | | TRANSMIT "STOP" COMMAND | | | | |
| 3 | | | | RECEIVE REMOTE CONTROL SIGNAL ("STOP"COMMAND) | | |
| 4 | | | | STOP TRANSMITTING STREAM AND READING STREAM | | |
| 5 | | | | | | CEASE TO RECEIVE STREAM |
| 6 | | | | | | STOP DECODING AND DISPLAYING STREAM |

INSTRUCTION FOR "STOP" IS GIVEN TO DVD PLAYER 1-2

FIG. 19

| | USER | REMOTE CONTROL 4 | DVD PLAYER 1-1 | DVD PLAYER 1-2 | RECEIVER 2-1 | RECEIVER 2-2 |
|---|---|---|---|---|---|---|
| 1 | PRESS REPRODUCTION BUTTON OF REMOTE CONTROL WITH REMOTE CONTROL DIRECTED TO RECEIVER 2-2 | | | | | |
| 2 | | TRANSMIT "PRESSING OF PLAY BUTTON" COMMAND | | | | |
| 3 | | | | | | RECEIVE REMOTE CONTROL SIGNAL ("PRESSING OF PLAY BUTTON" COMMAND) |
| 4 | | | | | | TRANSFER RECEIVED COMMAND TO SOURCE APPARATUS (DVD PLAYER 1-2 IN THIS CASE) |
| 5 | | | | RECEIVE "PRESSING OF PLAY BUTTON" COMMAND) | | |
| 6 | | | | START REPRODUCTION AND TRANSMIT READ STREAM TO SYNC APPARATUS (RECEIVER 2-2 IN THIS CASE) | | |
| 7 | | | | | | RECEIVE STREAM |
| 8 | | | | | | DECODE AND DISPLAY RECEIVED STREAM |
| 9 | | | | | | |

INSTRUCTION FOR "REPRODUCTION" IS GIVEN TO TELEVISION

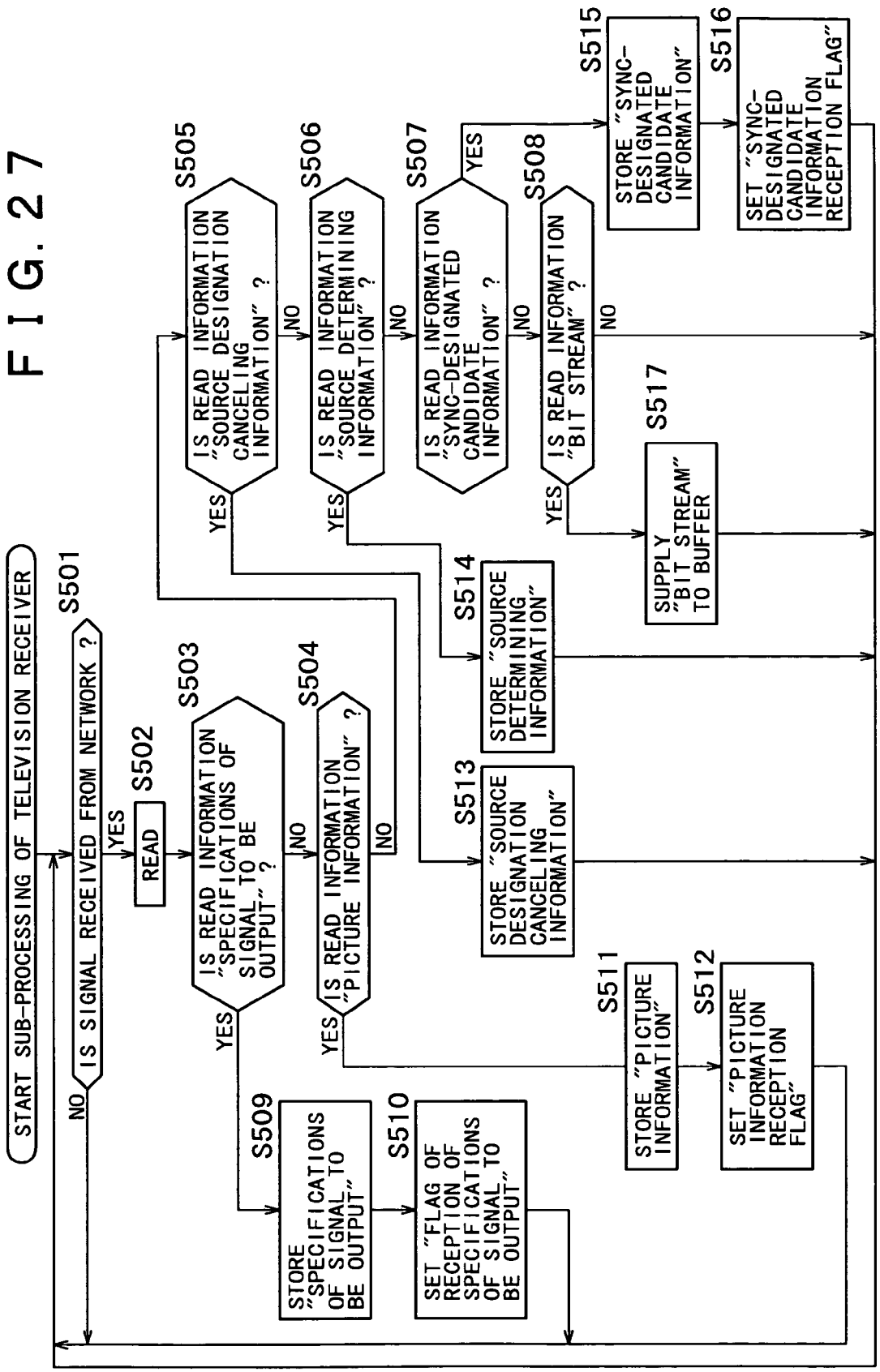

COMMUNICATION APPARATUS AND METHOD, RECORDING MEDIUM, AND PROGRAM

CROSS-REFERENCE TO RELATED APPLICATIONS

The present application claims priority from Japanese Application No. 2001-392362 filed Dec. 25, 2001, the disclosure of which is hereby incorporated by reference herein.

BACKGROUND OF THE INVENTION

The present invention relates to an apparatus and a method for communication, a recording medium, and a program, and particularly to an apparatus and a method for communication, a recording medium, and a program suitable for use in interconnecting a plurality of household communication apparatus and AV apparatus, for example.

Recently, network systems that interconnect personal computers and AV apparatus have been spreading to companies, schools and the like, and attempts have been made to distribute AV (audio-video) contents using the system. It is, of course, conceivable to apply the concept of such a network system to the replacement of wiring of AV apparatus within a house using audio cables and video cables with a data bus network. Conceivable as the data bus network is an IEEE (Institute of Electrical and Electronics Engineers) 1394 data bus network or a LAN (Local Area Network) using TCP/IP (Transmission Control Protocol/Internet Protocol), for example.

Replacing the wiring of AV apparatus within a house with a data bus network means connecting each of, for example, DVD (Digital Versatile Disk) players, displays (including television receivers), speakers and the like to a predetermined network. When a DVD is reproduced by a DVD player, for example, reproduced AV data is supplied to a display and a speaker or the like via the data bus network, and corresponding moving picture video and audio are output from the display and speaker or the like. A system that connects AV apparatus by a data bus network will hereinafter be referred to as an AV network system.

It is considered that a remote control unit (hereinafter also described as a remote control) is used for basic operation in an AV network system as described above. However, a method of remote control operation of the AV network system, a method of realizing it and the like have not been fully studied yet.

Thus, operation of an existing AV network system similar to operation of an audio-video system wired by conventional audio cables and video cables has been considered.

Consider an AV network system in which a first DVD player and a second DVD player are connected to one display (which may be a television receiver), for example. For the display to use an input from the first DVD player as an input 1 and an input from the second DVD player as an input 2, a user needs to perform such initial setting intentionally. In addition, setting is required each time the system is expanded, for example by adding a third DVD player.

Incidentally, there is a technique for performing the setting on behalf of the user by providing a function of automatically assigning input numbers of the input 1, the input 2 and the like from the DVD players to the display and the like. However, when the second DVD player is desired to be a source apparatus for the display, that is, video reproduced by the second DVD player is desired to be displayed on the display after the setting, the user needs to operate the remote control directed to the display to designate the source signal for display. Hence, when the function of automatically assigning input numbers is used, the user needs to be familiar with the result of the assignment.

SUMMARY OF THE INVENTION

It is accordingly an object of the present invention to realize an AV network system that allows a source apparatus and a sink apparatus for receiving AV contents data supplied by the source apparatus to be selected by intuitive operations using a remote control.

According to a first aspect of the present invention, there is provided a first communication apparatus for communicating data via a network, including a detecting unit operable to detect a control signal having a first portion, a middle portion, and a last portion; a transmitter operable to transmit a signal to another communication apparatus via the network; a receiving unit operable to receive a signal transmitted by the another communication apparatus via the network; and a setting unit operable to set the communication apparatus as a source apparatus in a source mode or as a sink apparatus in a sink mode; in the sink mode, when the detecting unit detects the first portion of the control signal, the transmitter transmits a source apparatus candidate signal indicating that the communication apparatus is selected as a candidate for the source apparatus, and thereafter when the receiving unit does not receive a source apparatus candidate signal transmitted by the another communication apparatus within a predetermined time, the transmitter transmits a source apparatus determining signal indicating that the communication apparatus is established as the source apparatus, and the setting unit sets the communication apparatus as the source apparatus; and in the sink mode, when the detecting unit detects the middle portion of the control signal after the receiving unit receives a source apparatus determining signal transmitted by the another communication apparatus, the transmitter transmits a sink apparatus candidate signal indicating that the communication apparatus is selected as a candidate for the sink apparatus, and thereafter when the detecting unit detects the last portion of the control signal, the transmitter transmits a sink apparatus determining signal indicating that the communication apparatus is established as the sink apparatus, and the setting unit sets the communication apparatus as the sink apparatus.

According to a second aspect of the present invention, there is provided a first method by which a communication apparatus communicates data via a network. The method includes detecting a control signal having a first portion, a middle portion, and a last portion; transmitting a signal to another communication apparatus via the network; receiving a signal transmitted by the another communication apparatus via the network; and setting the communication apparatus as a source apparatus in a source mode or as a sink apparatus in a sink mode; in the source mode, when the detecting step detects the first portion of the control signal, the transmitting step transmits a source apparatus candidate signal indicating that the communication apparatus is selected as a candidate for the source apparatus, and thereafter when the receiving step does not receive a source apparatus candidate signal transmitted by the another communication apparatus within a predetermined time, the transmitting step transmits a source apparatus determining signal indicating that the communication apparatus is established as the source apparatus, and the setting step sets the communication apparatus as the source apparatus; and in the sink mode, when the detecting step detects the middle portion of the control signal after the receiving step receives a source apparatus determining signal transmitted by the another communication apparatus, the transmitting step transmits a sink apparatus candidate signal indicating that the communication apparatus is selected as a candidate for the sink apparatus, and thereafter when the detecting step detects the last portion of the control signal, the transmitting step transmits a sink apparatus determining signal indicating that the communication apparatus is established as the sink apparatus, and the setting step sets the communication apparatus as the sink apparatus.

According to a third aspect of the present invention, there is provided a first recording medium recorded with a computer readable program for causing a communication apparatus to communicate data via a network, the program including detecting a control signal having a first portion, a middle portion, and a last portion; transmitting a signal to another communication apparatus via the network; receiving a signal transmitted by the another communication apparatus via the network; and setting the communication apparatus as a source apparatus in a source mode or as a sink apparatus in a sink mode; in the source mode, when the detecting step detects the first portion of the control signal, the transmitting step transmits a source apparatus candidate signal indicating that the communication apparatus is selected as a candidate for the source apparatus, and thereafter when the receiving step does not receive a source apparatus candidate signal transmitted by the another communication apparatus within a predetermined time, the transmitting step transmits a source apparatus determining signal indicating that the communication apparatus is established as the source apparatus, and the setting step sets the communication apparatus as the source apparatus; and in the sink mode, when the detecting step detects the middle portion of the control signal after the receiving step receives a source apparatus determining signal transmitted by the another communication apparatus, the transmitting step transmits a sink apparatus candidate signal indicating that the communication apparatus is selected as a candidate for the sink apparatus, and thereafter when the detecting step detects the last portion of the control signal, the transmitting step transmits a sink apparatus determining signal indicating that the communication apparatus is established as the sink apparatus, and the setting step sets the communication apparatus as the sink apparatus.

According to a fourth aspect of the present invention, there is provided a first system in which a communication apparatus communicates data via a network, the system including a processor operable to execute instructions; and instructions, the instructions including detecting a control signal having a first portion, a middle portion, and a last portion; transmitting a signal to another communication apparatus via the network; receiving a signal transmitted by the another communication apparatus via the network; and setting the communication apparatus as a source apparatus in a source mode or as a sink apparatus in a sink mode; in the source mode, when the detecting step detects the first portion of the control signal, the transmitting step transmits a source apparatus candidate signal indicating that the communication apparatus is selected as a candidate for the source apparatus, and thereafter when the receiving step does not receive a source apparatus candidate signal transmitted by the another communication apparatus within a predetermined time, the transmitting step transmits a source apparatus determining signal indicating that the communication apparatus is established as the source apparatus, and the setting step sets the communication apparatus as the source apparatus; and in the sink mode, when the detecting step detects the middle portion of the control signal after the receiving step receives a source apparatus determining signal transmitted by the another communication apparatus, the transmitting step transmits a sink apparatus candidate signal indicating that the communication apparatus is selected as a candidate for the sink apparatus, and thereafter when the detecting step detects the last portion of the control signal, the transmitting step transmits a sink apparatus determining signal indicating that the communication apparatus is established as the sink apparatus, and the setting step sets the communication apparatus as the sink apparatus.

According to a fifth aspect of the present invention, there is provided a second communication apparatus for transmitting data via a network, including a detecting unit operable to detect a control signal having a first portion, a middle portion, and a last portion; a transmitter operable to transmit a signal to another communication apparatus via the network; a receiving unit operable to receive a signal transmitted by the another communication apparatus via the network; and a setting unit operable to set the communication apparatus as a source apparatus; wherein when the detecting unit detects the first portion of the control signal, the transmitter transmits a source apparatus candidate signal indicating that the communication apparatus is selected as a candidate for the source apparatus, and thereafter when the receiving unit does not receive a source apparatus candidate signal transmitted by the another communication apparatus within a predetermined time, the transmitter transmits a source apparatus determining signal indicating that the communication apparatus is established as the source apparatus, and the setting unit sets the communication apparatus as the source apparatus.

According to a sixth aspect of the present invention, there is provided a second method by which a communication apparatus transmits data via a network. The method includes detecting a control signal having a first portion, a middle portion, and a last portion; transmitting a signal to another communication apparatus via the network; receiving a signal transmitted by the another communication apparatus via the network; and setting the communication apparatus as a source apparatus; wherein when the detecting step detects the first portion of the control signal, the transmitting step transmits a source apparatus candidate signal indicating that the communication apparatus is selected as a candidate for the source apparatus, and thereafter when the receiving step does not receive a source apparatus candidate signal transmitted by the another communication apparatus within a predetermined time, the transmitting step transmits a source apparatus determining signal indicating that the communication apparatus is established as the source apparatus, and the setting step sets the communication apparatus as the source apparatus.

According to a seventh aspect of the present invention, there is provided a second recording medium recorded with a computer readable program for causing a communication apparatus to transmit data via a network, the program including detecting a control signal having a first portion, a middle portion, and a last portion; transmitting a signal to another communication apparatus via the network; receiving a signal transmitted by the another communication apparatus via the network; and setting a communication apparatus as a source apparatus; wherein when the detecting step detects the first portion of the control signal, the transmitting step transmits a source apparatus candidate signal indicating that the communication apparatus is selected as a candidate for the source apparatus, and thereafter when the receiving step does not receive a source apparatus candidate signal transmitted by the another communication apparatus within a predetermined time, the transmitting step transmits a source apparatus determining signal indicating that the communication apparatus is established as the source apparatus, and the setting step sets the communication apparatus as the source apparatus.

According to an eighth aspect of the present invention, there is provided a second system in which a communication apparatus transmits data via a network, the system including a processor operable to execute instructions; and instructions, the instructions including detecting a control signal having a first portion, a middle portion, and a last portion; transmitting a signal to another communication apparatus via the network; receiving a signal transmitted by the another communication apparatus via the network; and setting the communication apparatus as a source apparatus; wherein when the detecting step detects the first portion of the control signal, the transmitting step transmits a source apparatus candidate signal indicating that the communication apparatus is selected as a candidate for the source apparatus, and thereafter when the receiving step does not receive a source apparatus candidate signal transmitted by the another communication apparatus within a predetermined time, the transmitting step transmits a source apparatus determining signal indicating that the communication apparatus is established as the source apparatus, and the setting step sets the communication apparatus as the source apparatus.

According to a ninth aspect of the present invention, there is provided a third communication apparatus for receiving data via a network, including a detecting unit operable to detect a control signal having a first portion, a middle portion, and a last portion; a transmitter operable to transmit a signal to another communication apparatus via the network; a receiving unit operable to receive a signal transmitted by the another communication apparatus via the network; and a setting unit operable to set the communication apparatus as a sink apparatus; wherein when the detecting unit detects the middle portion of the control signal after the receiving unit receives a source apparatus determining signal transmitted by the another communication apparatus, the transmitter transmits a sink apparatus candidate signal indicating that the communication apparatus is selected as a candidate for the sink apparatus, and thereafter when the detecting unit detects the last portion of the control signal, the transmitter transmits a sink apparatus determining signal indicating that the communication apparatus is established as the sink apparatus, and the setting unit sets the communication apparatus as the sink apparatus.

According to a tenth aspect of the present invention, there is provided a third method by which a communication apparatus receives data via a network. The method includes detecting a control signal having a first portion, a middle portion, and a last portion; transmitting a signal to another communication apparatus via the network; receiving a signal transmitted by the another communication apparatus via the network; and setting the communication apparatus as a sink apparatus; wherein when the detecting step detects the middle portion of the control signal after the receiving step receives a source apparatus determining signal transmitted by the another communication apparatus, the transmitting step transmits a sink apparatus candidate signal indicating that the communication apparatus is selected as a candidate for the sink apparatus, and thereafter when the detecting step detects the last portion of the control signal, the transmitting step transmits a sink apparatus determining signal indicating that the communication apparatus is established as the sink apparatus, and the setting step sets the communication apparatus as the sink apparatus.

According to an eleventh aspect of the present invention, there is provided a third recording medium recorded with a computer readable program for causing a communication apparatus to receive data via a network, the program including detecting a control signal having a first portion, a middle portion, and a last portion; transmitting a signal to another communication apparatus via the network; receiving a signal transmitted by the another communication apparatus via the network; and setting the communication apparatus as a sink apparatus; wherein when the detecting step detects the middle portion of the control signal after the receiving step receives a source apparatus determining signal transmitted by the another communication apparatus, the transmitting step transmits a sink apparatus candidate signal indicating that the communication apparatus is selected as a candidate for the sink apparatus, and thereafter when the detecting step detects the last portion of the control signal, the transmitting step transmits a sink apparatus determining signal indicating that the communication apparatus is established as the sink apparatus, and the setting step sets the communication apparatus as the sink apparatus.

According to a twelfth aspect of the present invention, there is provided a third system in which a communication apparatus receives data via a network, the system including a processor operable to execute instructions; and instructions, the instructions including detecting a control signal having a first portion, a middle portion, and a last portion; transmitting a signal to another communication apparatus via the network; receiving a signal transmitted by the another communication apparatus via the network; and setting the communication apparatus as a sink apparatus; wherein when detecting step detects the middle portion of the control signal after the receiving step receives a source apparatus determining signal transmitted by the another communication apparatus, the transmitting step transmits a sink apparatus candidate signal indicating that the communication apparatus is selected as a candidate for the sink apparatus, and thereafter when the detecting step detects the last portion of the control signal, the transmitting step transmits a sink apparatus determining signal indicating that the communication apparatus is established as the sink apparatus, and the setting step sets the communication apparatus as the sink apparatus.

With the first communication apparatus, method and program according to the present invention, a control signal having a first portion, a middle portion, and a last portion is detected, a signal is transmitted to another communication apparatus via a network, and a signal transmitted by the another communication apparatus is received via the network. Further, the communication apparatus is set as a source apparatus in a source mode or as a sink apparatus in a sink mode. In the source mode, when the detection processing detects the first portion of the control signal, the transmission processing transmits a source apparatus candidate signal indicating that the communication apparatus is selected as a candidate for the source apparatus, and thereafter when the reception processing does not receive a source apparatus candidate signal transmitted by the another communication apparatus within a predetermined time, the transmission processing transmits a source apparatus determining signal indicating that the communication apparatus is established as the source apparatus, and the setting processing sets the communication apparatus as the source apparatus. In the sink mode, when the detection processing detects the middle portion of the control signal after the reception processing receives a source apparatus determining signal transmitted by the another communication apparatus, the transmission processing transmits a sink apparatus candidate signal indicating that the communication apparatus is selected as a candidate for the sink apparatus, and thereafter when the detection processing detects the last portion of the control signal, the transmission processing transmits a sink apparatus determining signal indicating that the communication apparatus is established as the sink apparatus, and the setting processing sets the communication apparatus as the sink apparatus.

With the second communication apparatus, method and program according to the present invention, a control signal having a first portion, a middle portion, and a last portion is detected, a signal is transmitted to another communication apparatus via a network, and a signal transmitted by the another communication apparatus is received via the network. Further, the communication apparatus is set as a source apparatus. When the detection processing detects the first portion of the control signal, the transmission processing transmits a source apparatus candidate signal indicating that the communication apparatus is selected as a candidate for the source apparatus, and thereafter when the reception processing does not receive a source apparatus candidate signal transmitted by the another communication apparatus within a predetermined time, the transmission processing transmits a source apparatus determining signal indicating that the communication apparatus is established as the source apparatus, and the setting processing sets the communication apparatus as the source apparatus.

With the third communication apparatus, method and program according to the present invention, a control signal having a first portion, a middle portion, and a last portion is detected, a signal is transmitted to another communication apparatus via a network, and a signal transmitted by the another communication apparatus is received via the network. Further, the communication apparatus is set as a sink apparatus. When the detection processing detects the middle portion of the control signal after the reception processing receives a source apparatus determining signal transmitted by the another communication apparatus, the transmission processing transmits a sink apparatus candidate signal indicating that the communication apparatus is selected as a candidate for the sink apparatus, and thereafter when the detection processing detects the last portion of the control signal, the transmission processing transmits a sink apparatus determining signal indicating that the communication apparatus is established as the sink apparatus, and the setting unit sets the communication apparatus as the sink apparatus.

BRIEF DESCRIPTION OF THE DRAWINGS

FIG. 8 is a diagram of assistance in explaining an outline of the operation of the AV network system;

FIG. 9 is a diagram of assistance in explaining an outline of the operation of the AV network system;

FIG. 10 is a diagram of assistance in explaining an outline of the operation of the AV network system;

FIG. 11 is a diagram of assistance in explaining an outline of the operation of the AV network system;

FIG. 12 is a diagram of assistance in explaining an outline of the operation of the AV network system;

FIG. 13 is a diagram of assistance in explaining an outline of the operation of the AV network system;

FIG. 14 is a diagram of assistance in explaining an outline of the operation of the AV network system;

FIG. 15 is a diagram of assistance in explaining an outline of the operation of the AV network system;

FIG. 16 is a diagram of assistance in explaining an outline of the operation of the AV network system;

FIG. 17 is a diagram of assistance in explaining an outline of the operation of the AV network system;

FIG. 18 is a diagram of assistance in explaining an outline of the operation of the AV network system;

FIG. 19 is a diagram of assistance in explaining an outline of the operation of the AV network system;

FIG. 27 is a flowchart of assistance in explaining sub-processing of the television receiver 2-1.

DETAILED DESCRIPTION

Figure 1:
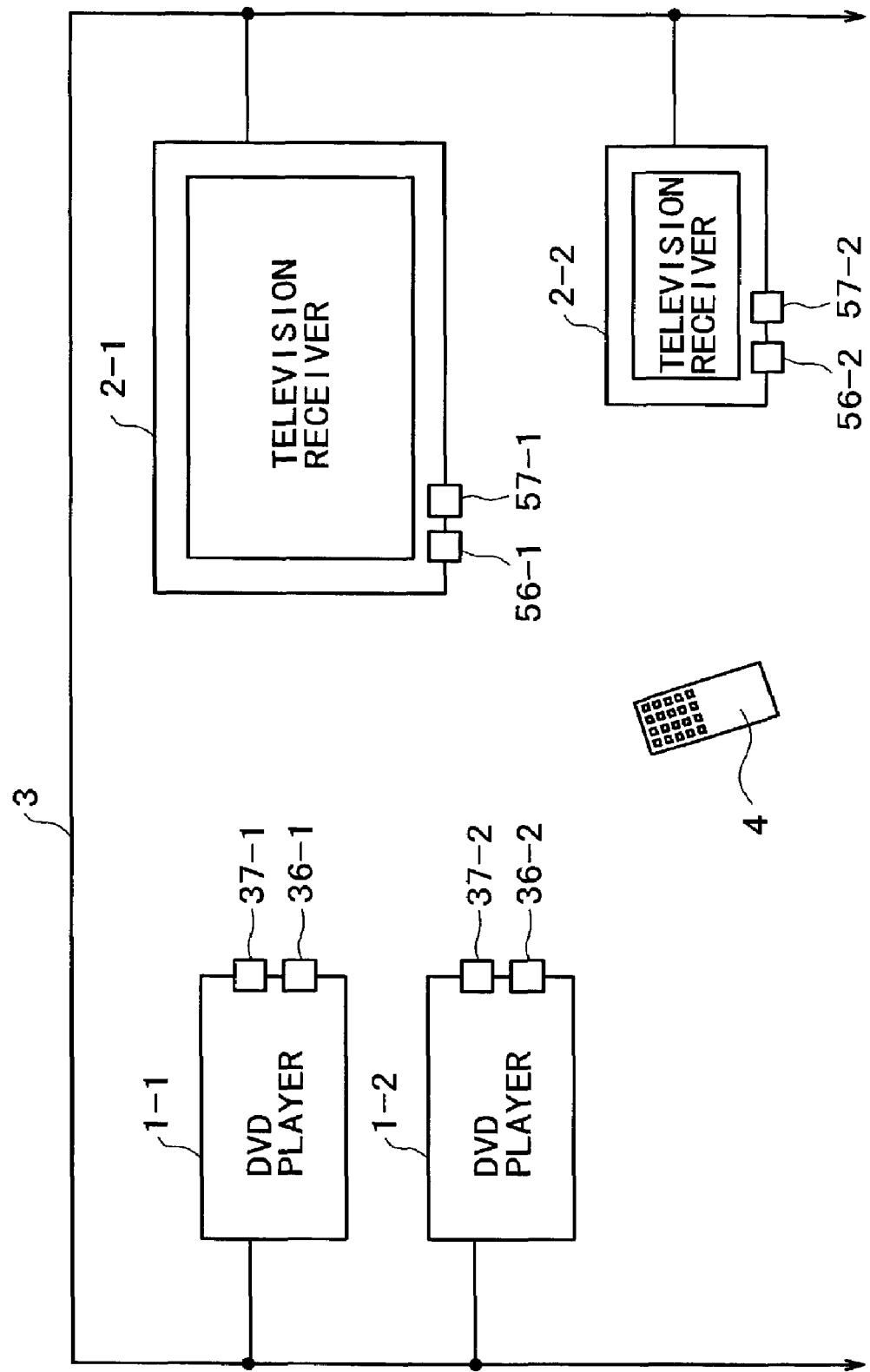
FIG. 1 is a block diagram showing an example of the configuration of an AV network system to which the present invention is applied.

A preferred embodiment of the present invention will hereinafter be described with reference to the drawings. FIG. 1 shows an example of the configuration of an AV network system to which the present invention is applied.

The AV network system includes DVD players 1-1 and 1-2, and television receivers 2-1 and 2-2, all of which are connected to each other via a network 3, and a remote control unit (hereinafter described as a remote control) 4.

When it is not necessary to differentiate the DVD players 1-1 and 1-2 from each other individually, the DVD players 1-1 and 1-2 will hereinafter be described simply as the DVD player 1. Also, when it is not necessary to differentiate the television receivers 2-1 and 2-2 from each other individually, the television receivers 2-1 and 2-2 will hereinafter be described simply as the television receiver 2. The same applies to light receiving units 36-1 and 36-2 and the like.

The DVD player 1 reads AV contents data recorded on a DVD medium, and then supplies the AV contents data to the television receiver 2 via the network 3. The DVD player 1 has on an exterior thereof a light receiving unit 36 for receiving a control signal transmitted by the remote control 4 (hereinafter also described as a remote control signal) and an LED (light-emitting diode) display unit 37 for notifying a user of a state of operation of the DVD player 1 by illuminating a predetermined number of times in a predetermined color.

The television receiver 2 displays video and outputs audio, the video and the audio corresponding to a television broadcast signal input from an antenna not shown in the figure. The television receiver 2 also decodes the AV contents data supplied thereto from the DVD player 1 via the network 3 and then displays video and outputs audio, the video and the audio corresponding to the AV contents data. The television receiver 2 has on an exterior thereof a light receiving unit 56 for receiving a control signal transmitted by the remote control 4 and an LED display unit 57 for notifying a user of a state of operation of the television receiver 2 by illuminating a predetermined number of times in a predetermined color.

The network 3 is, for example, an IEEE1394 data bus, a LAN in accordance with TCP/IP or the like. It is to be noted that the network 3 may be formed by a cable or by radio.

The remote control 4 transmits a control signal corresponding to an input from the user to the DVD player 1, the television receiver 2 or the like to which the user directs the remote control 4.

Figure 2:
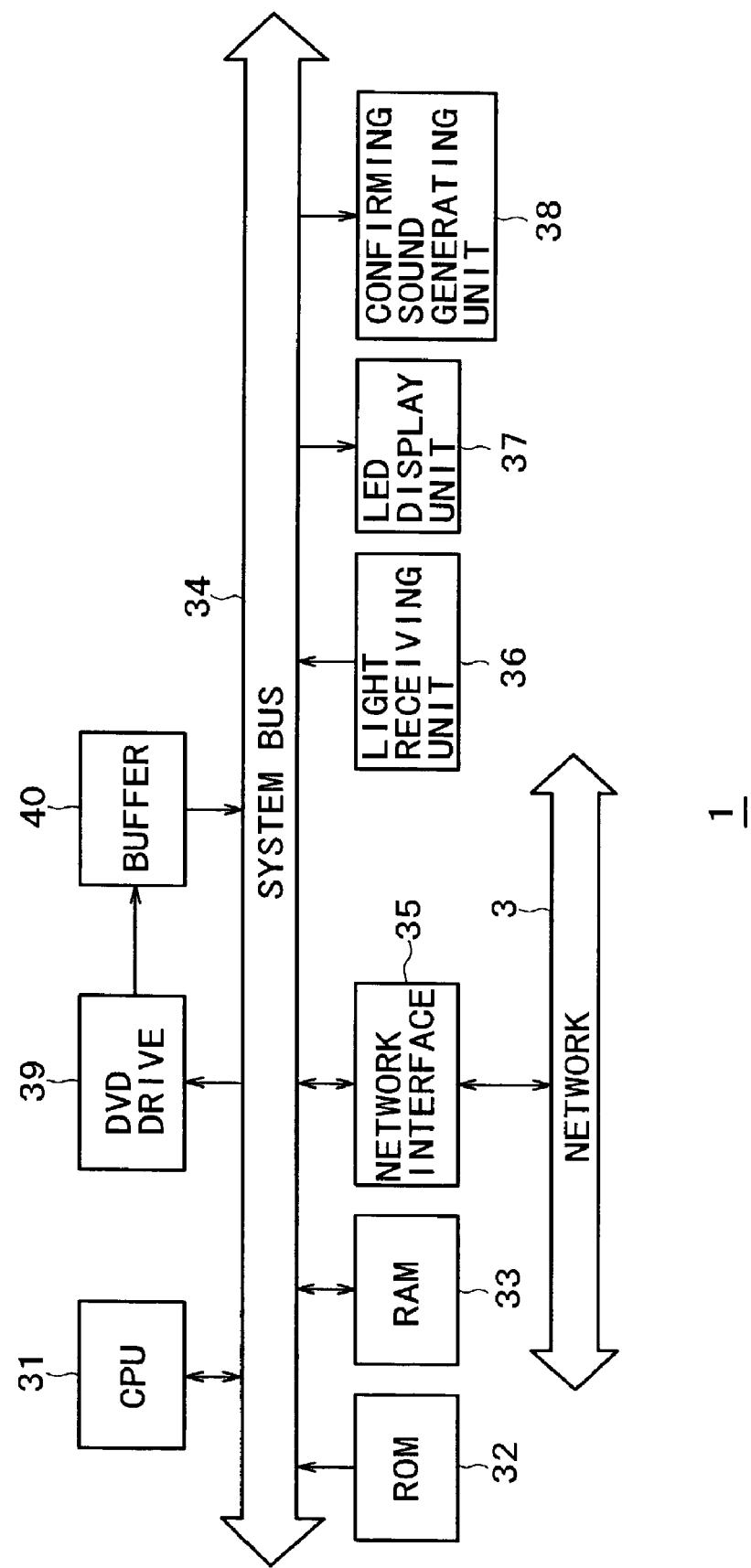
FIG. 2 is a block diagram showing an example of the configuration of a DVD player 1 in FIG. 1.

FIG. 2 shows an example of the configuration of the DVD player 1 in FIG. 1. The DVD player 1 has a CPU 31, a ROM 32, and a RAM 33, all of which are connected to each other by a system bus 34. The system bus 34 is connected with a network interface 35 for transmitting a bit stream of AV contents data and the like to the television receiver 2 via the network 3.

The system bus 34 is also connected with a DVD drive 39 and a buffer 40. The DVD drive 39 stores therewithin a DVD medium not shown in the figure. In response to an instruction from the CPU 31, the DVD drive 39 reads AV contents data recorded on the DVD medium and then outputs a corresponding bit stream to the buffer 40. The bit stream of the AV contents data buffered in the buffer 40 is supplied to the television receiver 2 or the like via the system bus 34, the network interface 35, and the network 3.

Further, the system bus 34 is connected with the light receiving unit 36, the LED display unit 37, and a confirming sound generating unit 38. The light receiving unit 36 outputs a control signal received from the remote control 4 to the CPU 31 via the system bus 34. The LED display unit 37 illuminates under control of the CPU 31. The confirming sound generating unit 38 generates a sound (for example, a beep or two beeps) indicating the state of operation of the DVD player 1 under control of the CPU 31.

Incidentally, the DVD player 1 can be provided with a decoder (not shown) for decoding the AV contents data read by the DVD drive 39.

Figure 3:
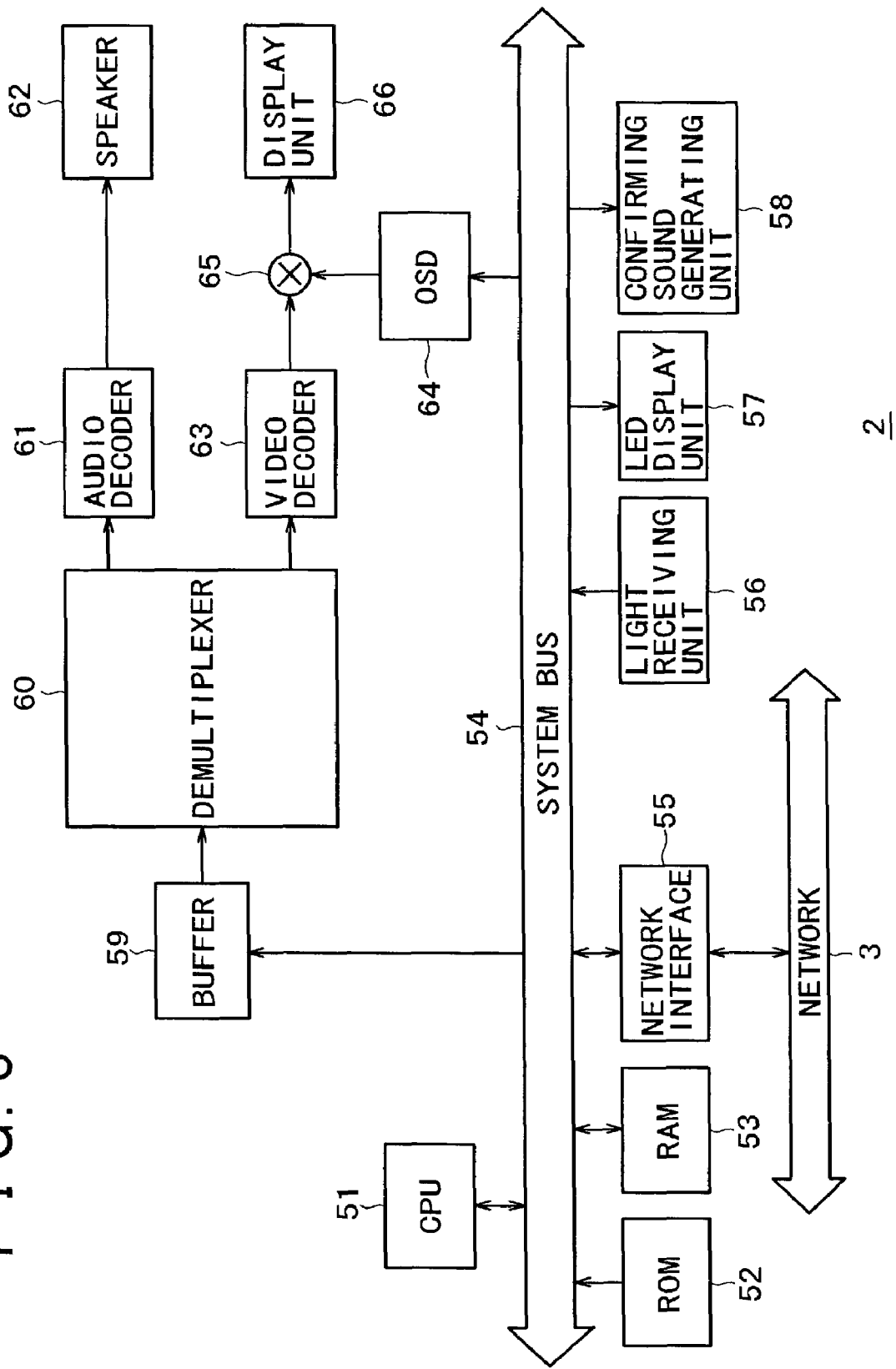
FIG. 3 is a block diagram showing an example of the configuration of a television receiver 2 in FIG. 1.

FIG. 3 shows an example of the configuration of the television receiver 2 in FIG. 1. The television receiver 2 has a CPU 51, a ROM 52, and a RAM 53, all of which are connected to each other by a system bus 54. The CPU 51 includes a timer for measuring a predetermined time.

The system bus 54 is connected with a network interface 55 for obtaining AV contents data and the like from the DVD player 1 via the network 3.

Further, the system bus 54 is connected with the light receiving unit 56, the LED display unit 57, and a confirming sound generating unit 58. The light receiving unit 56 outputs a control signal received from the remote control 4 to the CPU 51 via the system bus 54. The LED display unit 57 illuminates under control of the CPU 51. The confirming sound generating unit 58 generates a sound (for example, a beep or two beeps) indicating the state of operation of the television receiver 2 under control of the CPU 51.

The television receiver 2 further includes a buffer 59, a demultiplexer 60, an audio decoder 61, a speaker 62, a video decoder 63, an OSD (On Screen Display) 64, a mixer 65, and a display unit 66. The television receiver 2 further includes a tuner (not shown) for receiving television broadcast signals.

The buffer 59 buffers a bit stream of AV contents data obtained by the network interface 55 from the DVD player 1. The demultiplexer 60 separates the bit stream of the AV contents data into an audio stream and a video stream. The audio decoder 61 decodes the audio stream. The speaker 62 outputs sound corresponding to the output of the audio decoder 61. The video decoder 63 decodes the video stream. The OSD 64 generates OSD data. The mixer 65 superimposes the OSD data on the output of the video decoder 63. The display unit 66 displays video corresponding to the output of the mixer 65.

Figure 4:
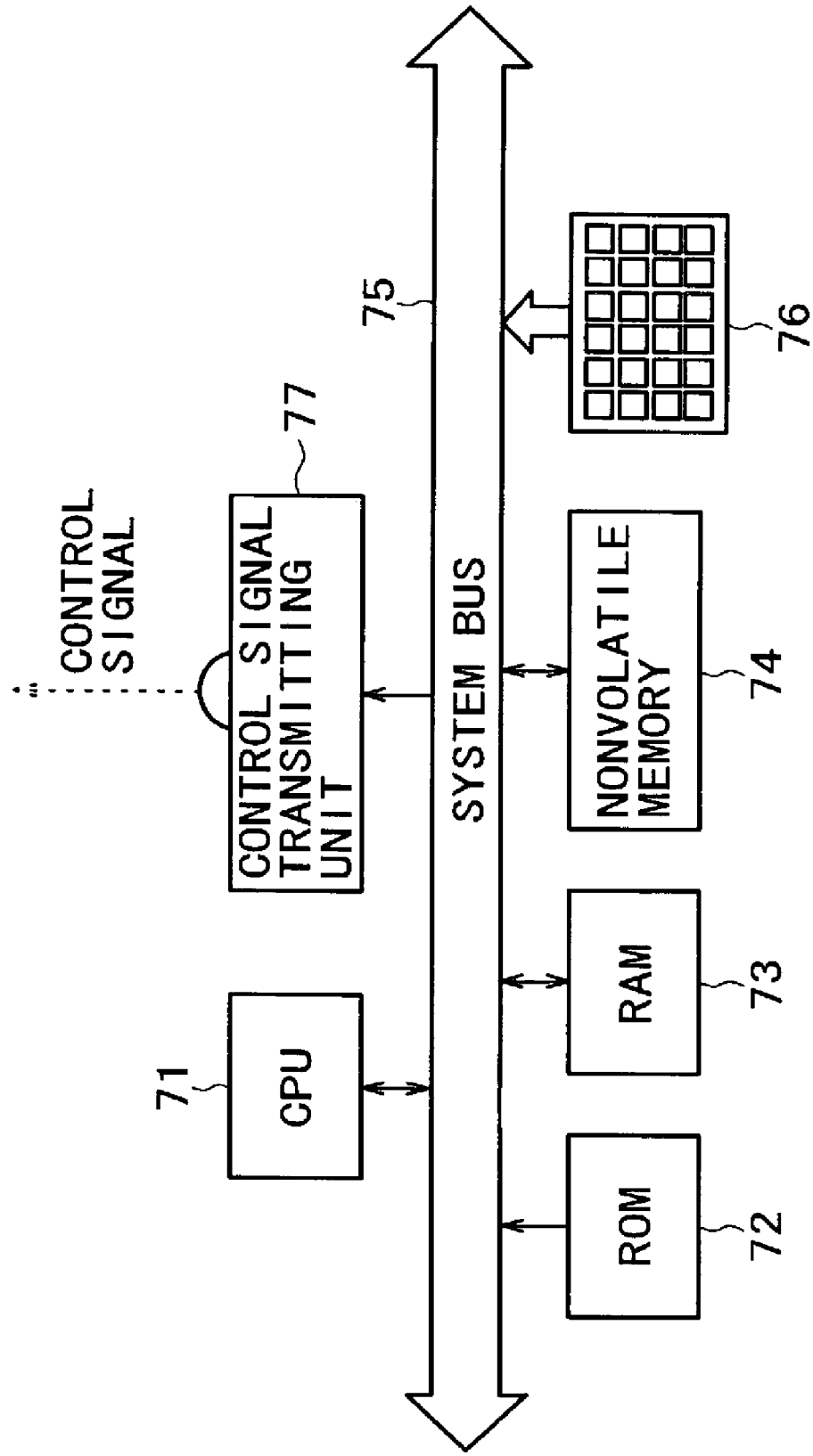
FIG. 4 is a block diagram showing an example of the configuration of a remote control 4 in FIG. 1.

FIG. 4 shows an example of the configuration of the remote control 4. The remote control 4 has a CPU 71, a ROM 72, and a RAM 73, all of which are connected to each other by a system bus 75. The CPU 71 includes a timer for measuring a predetermined time.

Further, the system bus 75 is connected with a nonvolatile memory 74 that retains written data even after power is turned off. The nonvolatile memory 74 records the session ID (to be described later) of a control signal last transmitted by the remote control 4.

Figure 5:
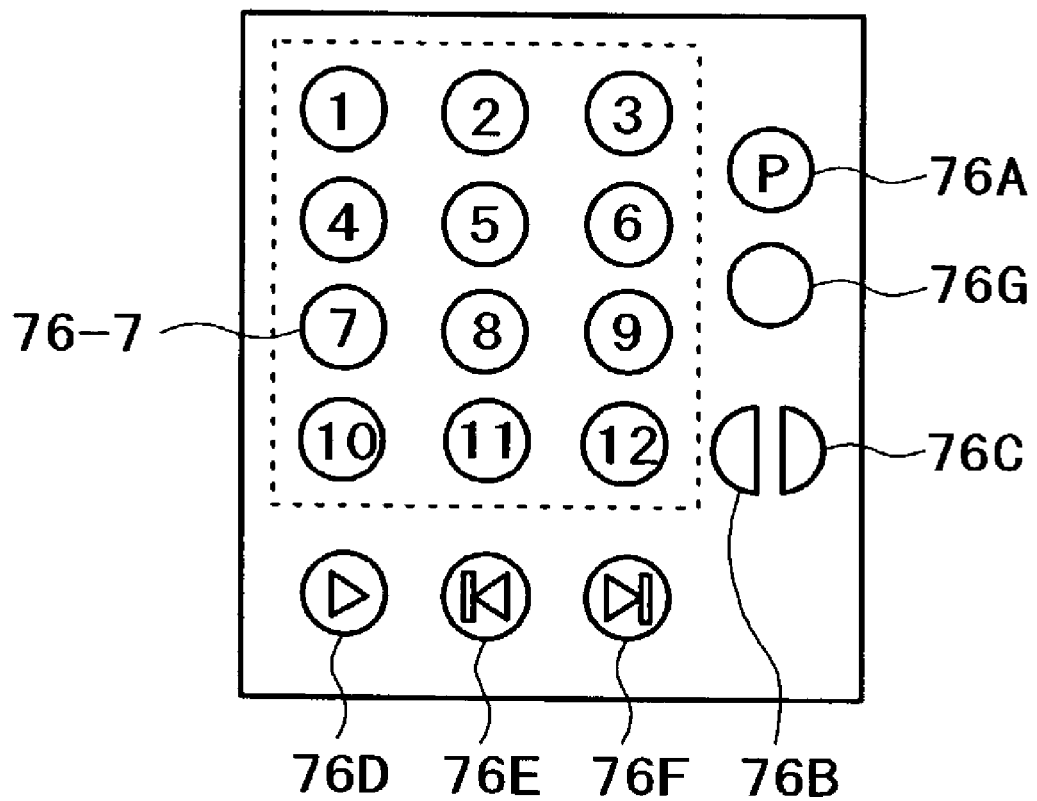
FIG. 5 is a diagram showing details of a control button unit 76 in FIG. 4.

The system bus 75 is further connected with a control button unit 76 and a control signal transmitting unit 77. The control button unit 76 is formed as shown in FIG. 5. The control button unit 76 detects an input (a depression of a button and a release of the depression) from a user, and sends the information to the CPU 71 via the system bus 75. The control signal transmitting unit 77 transmits a control signal corresponding to the input of the user under control of the CPU 71.

It is to be noted that while infrared rays and radio waves, for example, can be used as the control signal transmitted by the control signal transmitting unit 77, the control signal needs to have a certain degree of directivity without being diffused so as to be transmitted to only an apparatus to which the remote control 4 is directed by the user.

FIG. 5 shows a detailed example of the configuration of the control button unit 76. The control button unit 76 includes: numeric buttons 76-1 to 76-12 depressed when numerals 1 to 12 are specified; a power supply button 76A depressed when power to an apparatus to which the remote control 4 is directed is to be turned on or off; a select button 76B depressed to set a source apparatus; a right button 76C; a reproduction button 76D depressed when an instruction for reproduction is given to the DVD player 1 or the like; a reverse button 76E depressed, for example, when an instruction to reverse the reproduction is given to the DVD player 1 or the like; a fast forward button 76F depressed, for example, when an instruction for fast-forwarding the reproduction is given to the DVD player 1 or the like; and an auxiliary button 76G.

Figure 6:
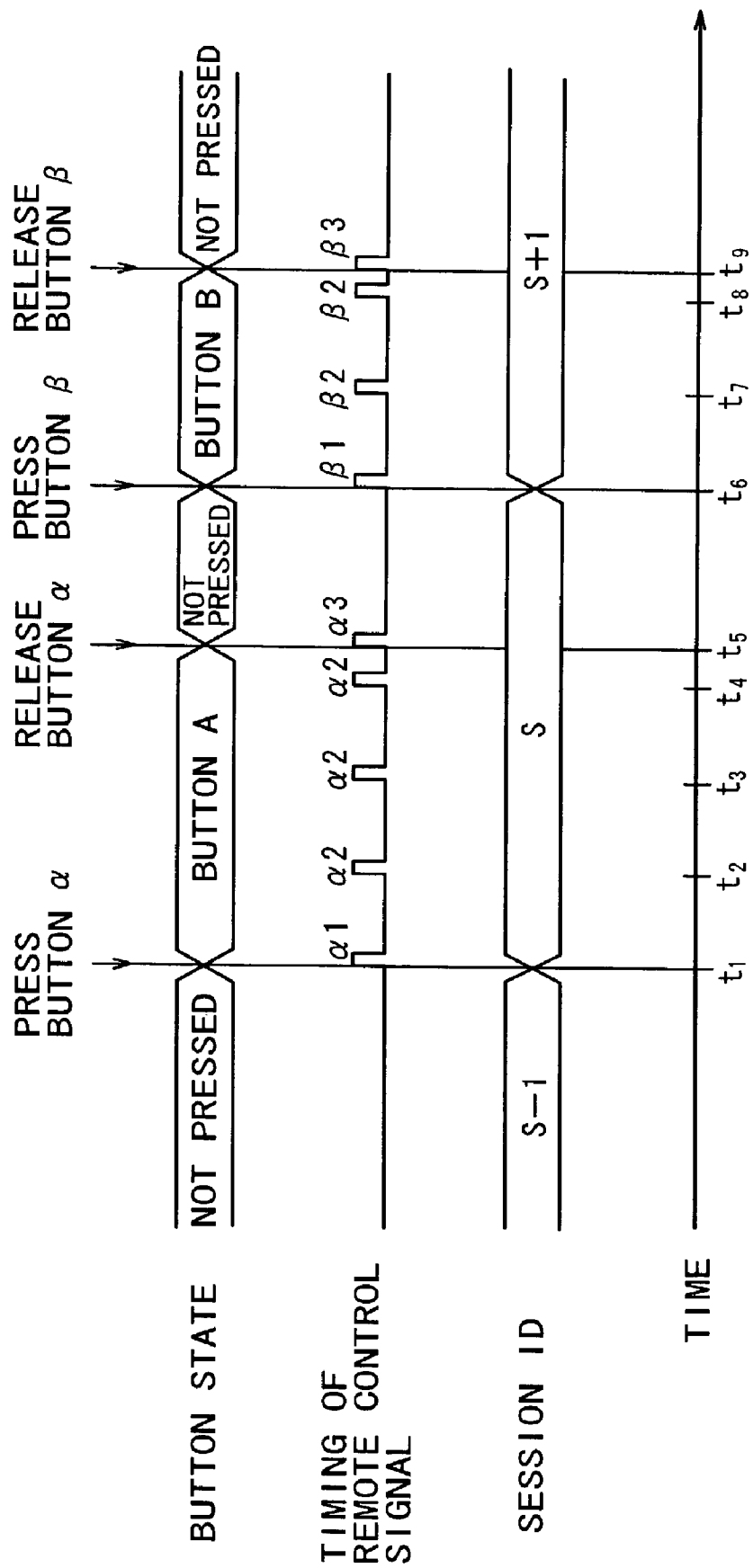
FIG. 6 is a diagram of assistance in explaining control signals transmitted by the remote control 4.

Operation of the remote control 4 when the buttons forming the control button unit 76 are depressed will be described with reference to FIG. 6. In the figure, the axis of the abscissas indicates the passage of time. FIG. 6 shows an example where no button has been depressed before time $t_1$, an arbitrary button (assumed to be a button α of the control button unit 76 is depressed at the time $t_1$ (continues to be depressed); the button α is released (the depression is released) at time $t_5$; an arbitrary button (assumed to be a button β) is depressed at time $t_6$ (continues to be depressed); and the button β is released (the depression is released) at time $t_9$.

In response to the button operations as described above, a control signal α1 corresponding to the depression of the α button, a remote control ID, and a session number "S" are transmitted at the time $t_1$. The remote control ID is unique identifying information given in advance to the remote control 4. The session number is a numerical value incremented by one each time a different button is depressed.

At times (times $t_2$, $t_3$, and $t_4$ in the case of FIG. 6) at predetermined intervals during the period from time $t_1$ to time $t_5$ during which the button α continues to be depressed, a control signal α2 indicating that the button α continues to be depressed, the remote control ID, and the session number "S" are transmitted. At the time $t_5$, a control signal α3 indicating that the button a has been released, the remote control ID, and the session number "S" are transmitted.

A control signal β1 corresponding to the depression of the button β, the remote control ID, and a session number "S+1" are transmitted at the time $t_6$. At times (times $t_7$ and $t_8$ in the case of FIG. 6) at predetermined intervals during the period from time $t_6$ to time $t_9$ during which the button β continues to be depressed, a control signal β2 indicating that the button β continues to be depressed, the remote control ID, and the session number "S+1" are transmitted. At the time $t_9$, a control signal β3 indicating that the button β has been released, the remote control ID, and the session number "S+1" are transmitted.

Figure 7:
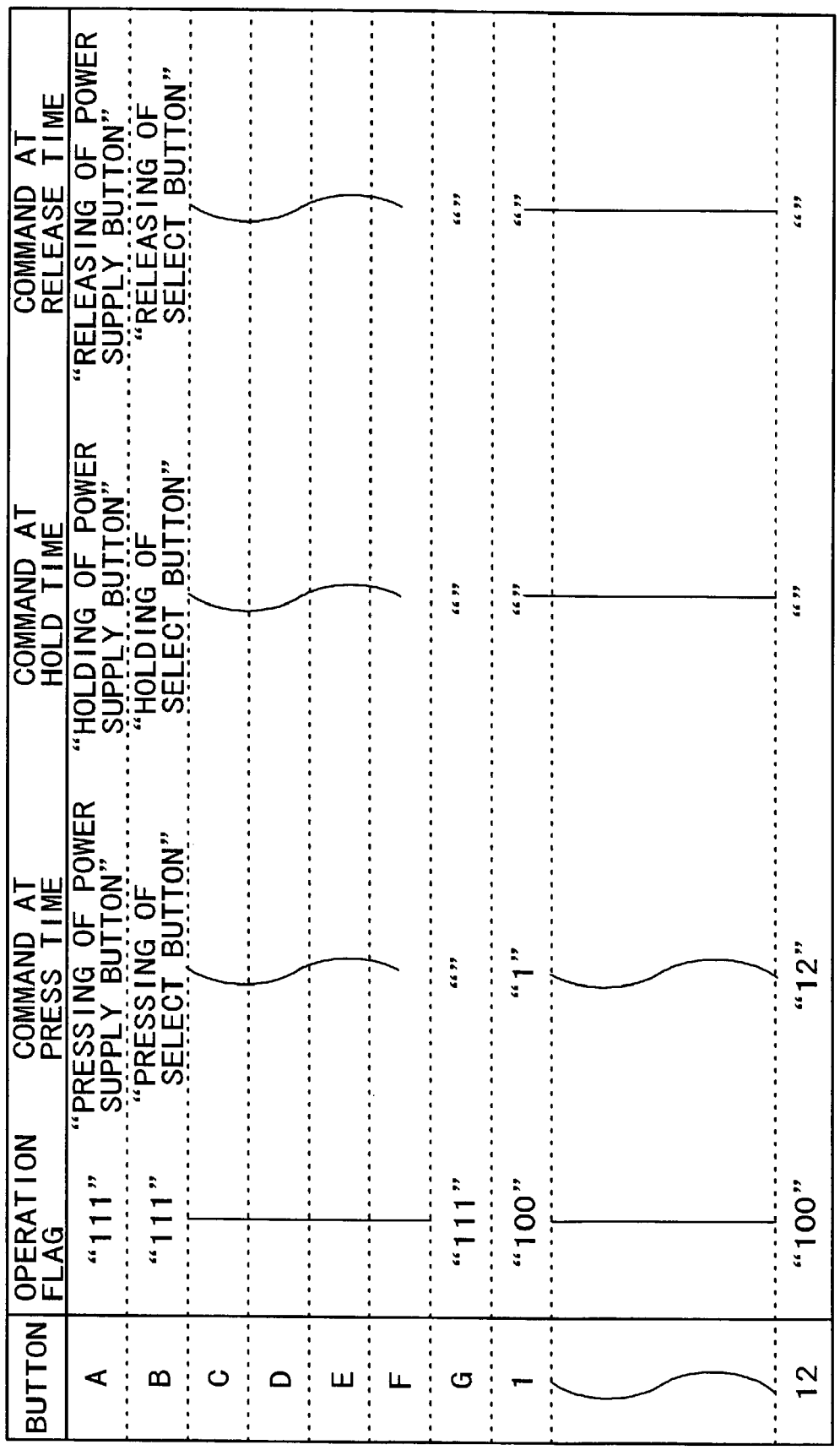
FIG. 7 is a diagram showing a button table stored in a ROM 72 in FIG. 4.

FIG. 7 shows a button table stored in the ROM 72. For each of the buttons forming the control button unit 76, the button table records an operation flag defining operations at the time of depressing the button (hereinafter also described as the press time), at the time when the button continues to be depressed (hereinafter also described as the hold time), and at the time of releasing the depression (hereinafter also described as the release time), and the meaning (command) of a control signal transmitted at each of the times.

The operation flag is a 3-bit flag in which the most significant bit indicates an operation at the press time, the second most significant bit indicates an operation at the hold time, and the least significant bit indicates an operation at the release time. Each of the bits when set to "1" indicates that a control signal is transmitted, and each of the bits when set to "0" indicates that no control signal is transmitted.

For example, the operation flag of the power supply button 76A is "111," which indicates that a control signal is transmitted at each of the press time, the hold time, and the release time. Commands at the press time, the hold time, and the release time indicate "pressing of the power supply button," "holding of the power supply button," and "releasing of the power supply button," respectively.

For example, the operation flag of the numeric button 76-1 is "100," which indicates that a control signal is transmitted at the press time but no control signal is transmitted at the hold time or the release time. The command at the press time indicates "1."

Operations by the user of the AV network system and an outline of the operations of the DVD players 1-1 and 1-2, the television receivers 2-1 and 2-2, and the remote control 4 which form the AV network system, will next be described with reference to FIGS. 8 to 19.

Hereinafter, an apparatus that outputs AV contents data for reproduction will be described as a source apparatus, and an apparatus that receives the AV contents data output by the source apparatus will be described as a sink apparatus.

FIGS. 8 to 19 show the communication of control signals and the like by the DVD players 1-1 and 1-2, the television receivers 2-1 and 2-2 (referred to as receivers 2-1 and 2-2, respectively, in the figures), and the remote control 4, which form the AV network system.

Specifically, FIG. 8 shows a case where a control signal for selecting the DVD player 1-1 as the source apparatus is also received by the DVD player 1-2. FIG. 9 shows a case where the DVD player 1-1 is selected as the source apparatus and then the selection is cancelled. FIG. 10 shows a case where the DVD player 1-2 is selected as the source apparatus. FIG. 11 shows a case where the operation for selecting the television receiver 2-1 as the sink apparatus is performed and the television receiver 2-1 as a candidate for the sink apparatus cannot reproduce data having the specifications of the output signals from the DVD player 1-2 as the source apparatus.

FIG. 12 shows a case where the operation for selecting the television receiver 2-1 as the sink apparatus is performed and the television receiver 2-1 as a candidate for the sink apparatus can reproduce data having the specifications of the output signals from the DVD player 1-2 as the source apparatus.

FIG. 13 shows a case where the television receiver 2-1 as a candidate for the sink apparatus reproduces thumbnail pictures and the like supplied from the DVD player 1-2 as the source apparatus. FIG. 14 shows a case where the sink apparatus is changed to the television receiver 2-2. FIG. 15 shows a case where the television receiver 2-2 as a candidate for the sink apparatus reproduces the thumbnail pictures and the like supplied from the DVD player 1-2 as the source apparatus. FIG. 16 shows a case where a connection between the DVD player 1-2 as the source apparatus and the television receiver 2-2 that has become the sink apparatus is established.

FIG. 17 shows a case where an instruction for reproduction is given to the DVD player 1-2 as the source apparatus. FIG. 18 shows a case where an instruction for stopping reproduction is given to the DVD player 1-2 as the source apparatus. FIG. 19 shows a case where an instruction for reproduction is given to the television receiver 2-2 as the sink apparatus instead of giving an instruction for reproduction to the DVD player 1-2 as the source apparatus.

When the DVD player 1-1 is to be set as the source apparatus and the television 2-1 is to be set as the sink apparatus, for example, the user directs the remote control 4 to the DVD player 1-1 and continues depressing the select button 76B. A control signal is thereby transmitted from the remote control 4. Receiving the control signal, the DVD player 1-1 lights the LED display unit 37-1 in green, and determines whether the control signal is received by another apparatus (for example, the DVD player 1-2) on the network 3. When the DVD player 1-1 determines that only the DVD player 1-1 itself has received the control signal, the DVD player 1-1 determines that the DVD player 1-1 itself is designated as the source apparatus. The DVD player 1-1 then notifies the user that the DVD player 1-1 has been designated as the source apparatus by generating a beep from the confirming sound generating unit 38-1 and blinking the LED display unit 37-1 in green, and also transmits the information to the network.

When another apparatus (for example, the DVD player 1-2) has also received the control signal, however, the DVD player 1-1 notifies the user of a failure in setting the source apparatus by blinking the LED display unit 37-1 in red, which unit has been lit in green, and generating two beeps from the confirming sound generating unit 38-1. The DVD players 1-1 and 1-2 are thereafter changed to an initial standby state.

Realizing the failure in setting the source apparatus, the user directs the remote control 4 in a direction where no apparatus are present, and then releases the depression of the select button 76B.

When the user changes the initial plan and is to designate the DVD player 1-2 as the source apparatus after setting the DVD player 1-1 as the source, the user directs the remote control 4 to the DVD player 1-2 and depresses the select button 76B. The DVD player 1-2 then performs a similar operation to the above-described operation of the DVD player 1-1, and finally notifies the user and the network that the DVD player 1-2 has been designated as the source apparatus. Receiving the notification from the DVD player 1-2, the DVD player 1-1 determines that the designation of the DVD player 1-1 as the source apparatus is cancelled.

Realizing the designation of the DVD player 1-2 as the source apparatus, the user directs the remote control 4 to the television receiver 2-1 while continuing to depress the select button 76B. That is, the user directs the remote control 4, transmitting a control signal indicating that the select button 76B continues to be depressed, to the television. receiver 2-1. In response to this, the television receiver 2-1 determines that the television receiver 2-1 itself has been set as a candidate for the sink apparatus.

Set as a candidate for the sink apparatus, the television receiver 2-1 inquires of the DVD player 1-2 as the source apparatus about the specifications of the signal to be output. In response to the inquiry, the DVD player 1-2 notifies the television receiver 2-1 of the specifications of the signal to be output, or in this case, the format of AV contents data, video resolution, aspect ratio and the like.

The television receiver 2-1 determines whether the television receiver 2-1 can reproduce (display video and output audio of) the signal to be output having the designated specifications. When the television receiver 2-1 determines that the television receiver 2-1 cannot reproduce the signal to be output by the source apparatus, the television receiver 2-1 notifies the user of this by blinking the LED display unit 57-1 in red and generating two beeps from the confirming sound generating unit 58-1.

When the television receiver 2-1 determines that the television receiver 2-1 can reproduce the signal to be output with the designated specifications, on the other hand, the television receiver 2-1 notifies the user that the television receiver 2-1 can reproduce the signal to be output by the source apparatus by blinking the LED display unit 57-1 in green and generating a beep from the confirming sound generating unit 58-1, and also transmits the information to the network. In synchronization with this, the LED display unit 37-2 of the DVD player 1-2 as the source apparatus also blinks in green. Thus, the blinking in green of the source apparatus and the candidate for the sink apparatus in synchronization with each other allows the user to be clearly notified of the connection between the source apparatus and the candidate for the sink apparatus.

The television receiver 2-1 thereafter sends a picture request to the DVD player 1-2. In response to the picture request, the DVD player 1-2 supplies the television receiver 2-1 with a thumbnail picture corresponding to AV contents data that can be supplied, for example. The television receiver 2-1 displays the supplied thumbnail picture and the like. By this action, the user can be more clearly notified of the connection between the source apparatus and the candidate for the sink apparatus, and can check the AV contents data that can be supplied by the DVD player 1-2.

Incidentally, when the user changes the initial plan and is to set the television receiver 2-2 as the sink apparatus, it suffices to direct the remote control 4 whose select button 76B continues to be depressed at this point in time to the television receiver 2-2.

In response to such an operation, the television receiver 2-2 performs a similar operation to the above-described operation of the television receiver 2-1 to become a candidate for the sink apparatus, notifies the user and the network that the television receiver 2-2 has become a candidate for the sink apparatus, and finally displays the thumbnail picture supplied from the DVD player 1-2 and the like.

On the other hand, the television receiver 2-1, which has been a candidate for the sink apparatus, receives the notification from the television receiver 2-2, determines that the designation of the television receiver 2-1 as a candidate for the sink apparatus is cancelled, and is changed to an initial standby state.

Realizing a connection between the DVD player 1-2 as the source apparatus and the television receiver 2-2 as a candidate for the sink apparatus, which blink in green in synchronization with each other, the user releases the depression of the select button 76B of the remote control 4 directed to the television receiver 2-2. The remote control 4 thereby transmits a control signal indicating that the depression of the select button 76B has been released.

Receiving the control signal, the television receiver 2-2 sends a connection request to the DVD player 1-2. Connection between the television receiver 2-2 and the DVD player 1-2 is thereby established. At this time, the television receiver 2-2 and the DVD player 1-2 notify the user of the establishment of the connection by generating a beep and blinking the LEDs in green in synchronization with each other.

When the user thereafter directs the remote control 4 to the DVD player 1-2 and depresses the play button 76D, AV contents data is read from a DVD medium inserted in the DVD player 1-2, and is supplied to the television receiver 2-2. The television receiver 2-2 displays video and outputs audio, the video and the audio corresponding to the AV contents data.

Incidentally, also when the user directs the remote control 4 to the television receiver 2-2 and depresses the play button 76D, similar processing is performed.

The processing of each of the DVD player 1, the television receiver 2, and the remote control 4, which form the AV network system, will next be described with reference to the flowcharts of FIGS. 20 to 27.

Figure 20:
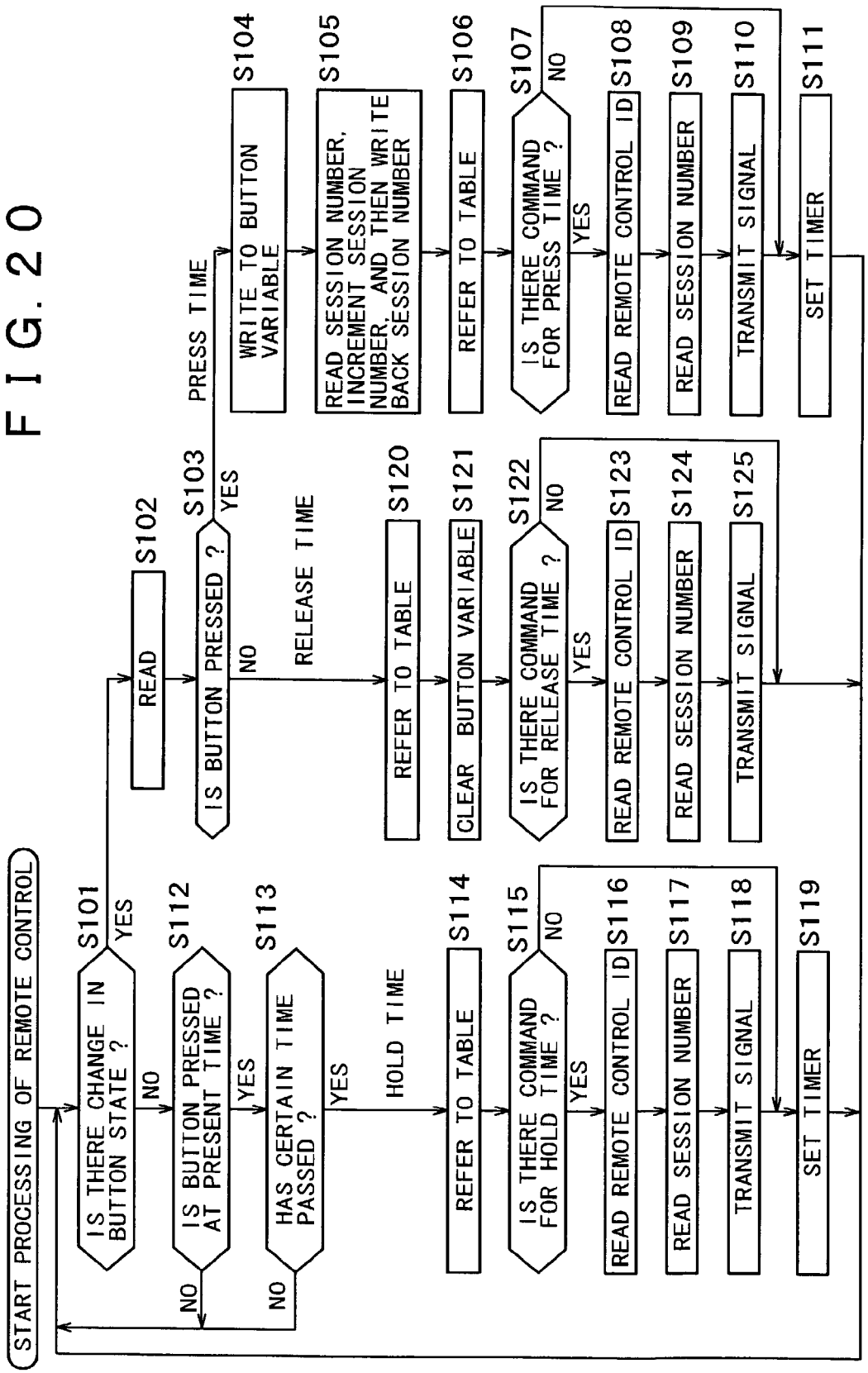
FIG. 20 is a flowchart of assistance in explaining the processing of the remote control 4.

FIG. 20 is a flowchart of assistance in explaining the processing of the remote control 4. A program for realizing this processing is stored in the ROM 72 and executed by the CPU 71.

In the following, the processing when one of the buttons of the control button unit 76 is depressed in a state in which no button is already depressed (at a press time) will be described, the processing when the button continues to be depressed (at a hold time) will next be described, and finally the processing when the depression of the button is released (at a release time) will be described.

At step S101, the CPU 71 inquires of the control button unit 76 whether there is a change in a state thereof. When there is a change in the state, the processing proceeds to step S102. When there is no change in the state, the processing proceeds to step S112.

At step S112, the CPU 71 checks a button variable to determine whether a button is pressed at the present time. When a button is pressed at the present time (button variable≠0), the processing proceeds to step S113. When no button is pressed (button variable=0), the processing returns to step At step S113, the CPU 71 checks an internal timer to determine whether a certain time has passed since setting the timer at step S119 or step S111. When the certain time has not passed, the processing returns to step S101. When the certain time has passed, the processing proceeds to step S114.

At step S102, the CPU 71 reads a pressed button from the control button unit 76. The value read from the control button unit 76 at this time is zero when the button is not pressed, and is a value corresponding to the button when the button is pressed.

At step S103, the CPU 71 checks the value of the read button to determine whether the button is pressed or not. When the button is pressed (the value of the button≠0), the processing proceeds to step S104. When the button is not pressed (the value of the button=0), the processing proceeds to step S120.

A press time will be described in the following. When the processing proceeds to step S104, the button is pressed as a result of the change in the state of the control button unit 76, which means that the button has changed from a non-pressed state to a pressed state. At step S104, the CPU 71 writes the value of the button read at step S102 to the button variable retained by the RAM 73.

At step S105, the CPU 71 reads a session ID corresponding to a control signal transmitted last time, the session ID being written in the nonvolatile memory 74, increments the session ID by one, sets the incremented session ID as a session ID of a control signal for this time, and then writes the session ID back to the nonvolatile memory 74.

At step S106, the CPU 71 refers to the button table in the ROM 72 and reads an operation flag and a command at the press time corresponding to the button variable. When the power supply button 76A is pressed, for example, the read operation flag is "111." The command at the press time is "pressing of the power supply button."

At step S107, when data for the press time (most significant bit) of the operation flag is "1," the CPU 71 proceeds to step S108. When the data is "0," on the other hand, the CPU 71 proceeds to step S111.

At step S108, the CPU 71 reads a remote control ID recorded in advance in the ROM 72. At step S109, the CPU 71 reads the session ID written in the nonvolatile memory 74. At step S110, the CPU 71 supplies the control signal transmitting unit 77 with the remote control command obtained at step S106, the remote control ID obtained at step S108, and the session ID obtained at step S109, and makes the control signal transmitting unit 77 transmit the remote control command, the remote control ID, and the session ID. This point in time corresponds to times $t_1$ and $t_6$ in FIG. 6.

At step S111, the CPU 71 starts measuring a predetermined time by the internal timer. The predetermined time is recorded in the ROM 72 in advance in the form of a program. The processing thereafter returns to step S101.

A hold time will be described in the following. When the processing proceeds to step S114, it means that the certain time has passed in a state in which the button is pressed since a start of measurement by the timer. At step S114, the CPU 71 refers to the button table in the ROM 72 and reads an operation flag and a command at the hold time corresponding to the button variable. When the power supply button continues to be depressed, for example, the read operation flag is "111." The command at the hold time is "holding of the power supply button."

At step S115, when data for the hold time (central bit) of the operation flag is "1," the CPU 71 proceeds to step S116. When the data is "0," on the other hand, the CPU 71 proceeds to step S119.

At step S116, the CPU 71 reads the remote control ID from the ROM 72. At step S117, the CPU 71 reads the session ID from the nonvolatile memory 74. At step S118, the CPU 71 supplies the control signal transmitting unit 77 with the remote control command obtained at step S114, the remote control ID obtained at step S116, and the session ID obtained at step S117, and makes the control signal transmitting unit 77 transmit the remote control command, the remote control ID, and the session ID. This point in time corresponds to times $t_2$ to $t_4$ or $t_7$ and $t_8$ in FIG. 6.

At step S119, the CPU 71 starts measurement by the internal timer. The processing thereafter returns to step S101.

A release time will be described in the following. When the processing proceeds to step S120, the button is not pressed as a result of the change in the state of the control button unit 76, which means that the button has changed from a pressed state to a non-pressed state.

At step S120, the CPU 71 refers to the button table in the ROM 72 and reads an operation flag and a command at the release time corresponding to the button variable. When the depression of the power supply button 76A is released, for example, the read operation flag is "111." The command at the release time is "releasing of the power supply button." At step S121, the CPU 71 clears the button variable.

At step S122, when data for the release time (least significant bit) of the operation flag is "1," the CPU 71 proceeds to step S123. When the data is "0," on the other hand, the CPU 71 returns to step S101.

At step S123, the CPU 71 reads the remote control ID from the ROM 72. At step S124, the CPU 71 reads the session ID from the nonvolatile memory 74. At step S125, the CPU 71 supplies the control signal transmitting unit 77 with the remote control command obtained at step S120, the remote control ID obtained at step S123, and the session ID obtained at step S124, and makes the control signal transmitting unit 77 transmit the remote control command, the remote control ID, and the session ID. This point in time corresponds to time $t_5$ or $t_9$ in FIG. 6. The processing thereafter returns to step S101. This concludes the description of the processing of the remote control 4.

The processing of the DVD player 1-1 will next be described. The processing performed by the DVD player 1-1 includes main processing for monitoring a control signal from the remote control 4 and various signals communicated thereto via the network 3 and changing status, and auxiliary sub-processing for storing the various signals in the RAM 33 when the various signals communicated thereto via the network 3 are received, and setting flags to notify the main processing of the reception. It is to be noted that the DVD player 1-2 performs similar processing; in the following description, however, the DVD player 1-2 is treated as another apparatus.

Incidentally, programs for the two types of processing performed by the CPU 31 of the DVD player 1-1 are each stored in the ROM 32, and are executed in parallel by the CPU 31.

Figure 21:
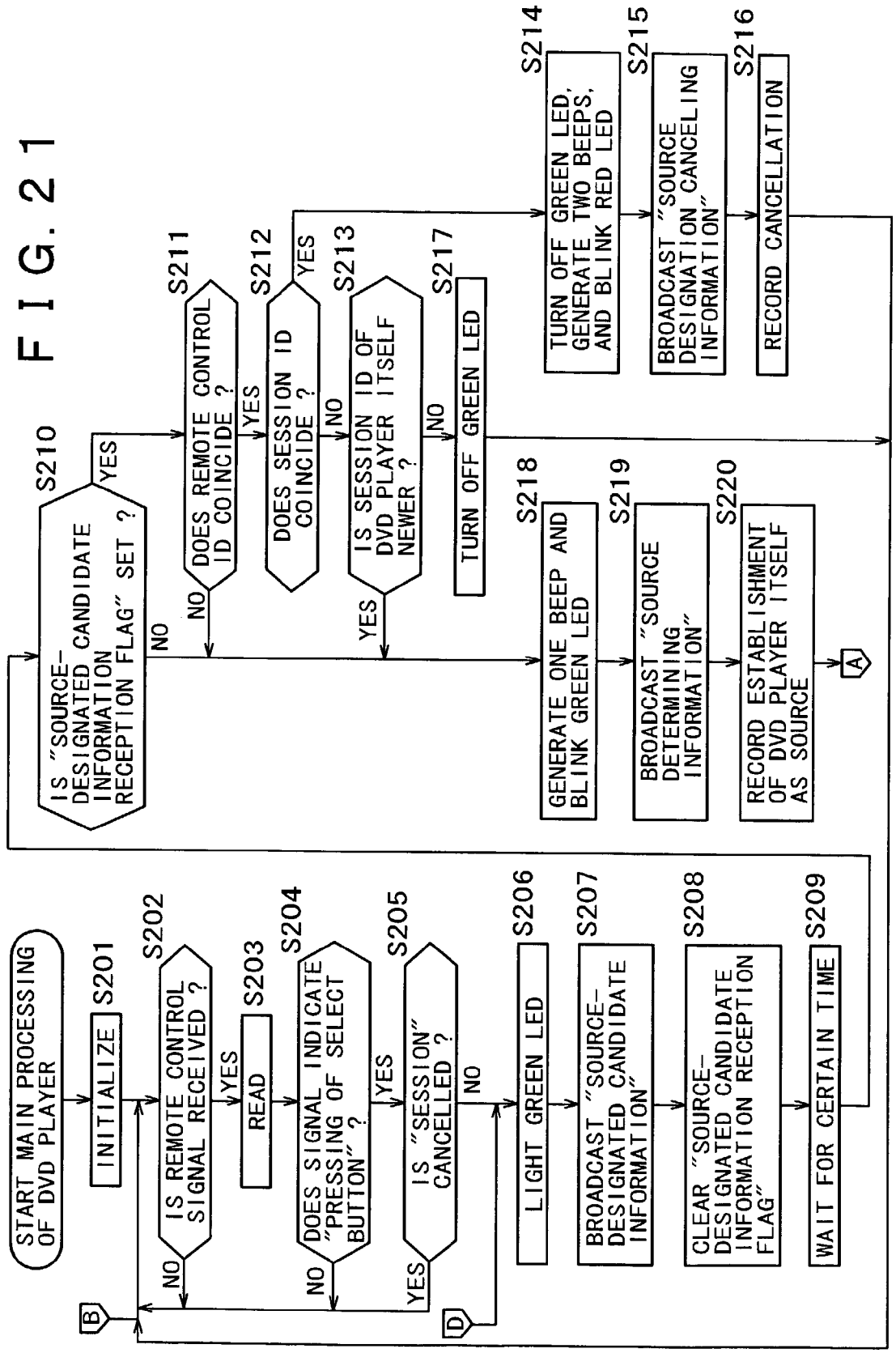
FIG. 21 is a flowchart of assistance in explaining the main processing of a DVD player 1-1.
Figure 22:
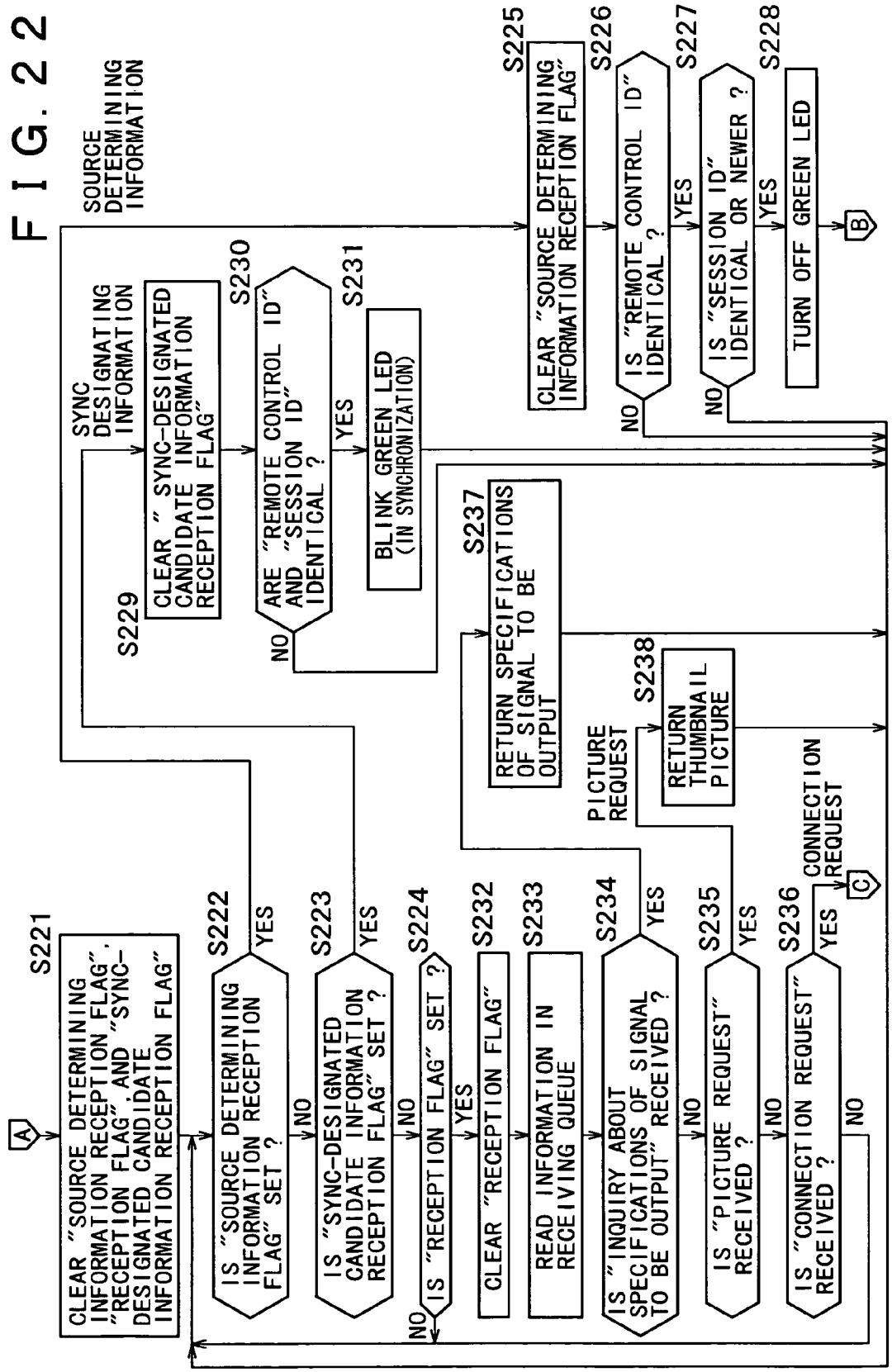
FIG. 22 is a flowchart of assistance in explaining the main processing of the DVD player 1-1.
Figure 23:
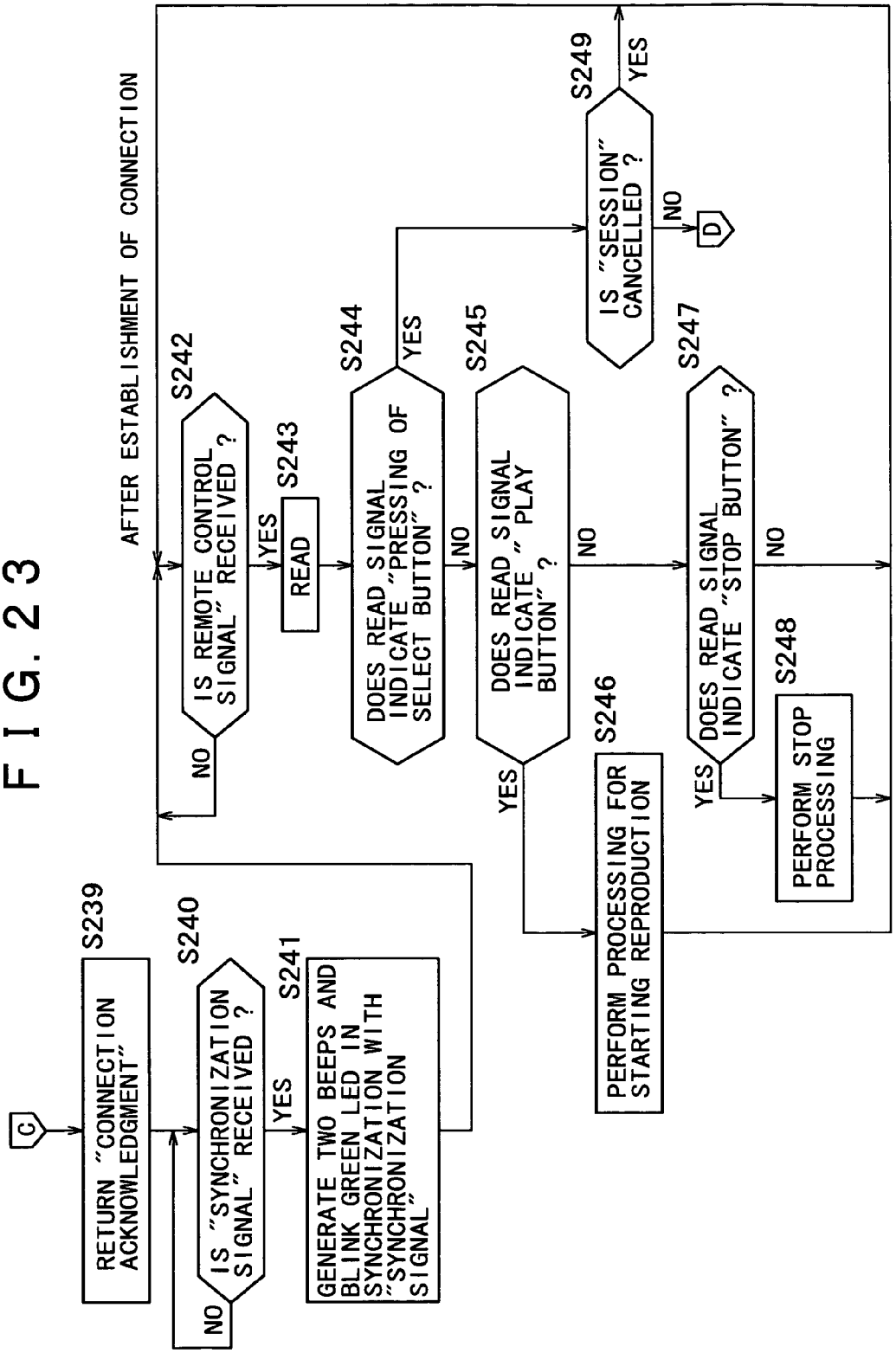
FIG. 23 is a flowchart of assistance in explaining the main processing of the DVD player 1-1.

FIGS. 21 to 23 are flowcharts of assistance in explaining the main processing. At step S201, the CPU 31 performs overall initialization before going into a standby state. Thereafter, the DVD player 1-1 is in a state of waiting for a control signal from the remote control 4. The CPU 31 also starts the sub-processing (to be described later with reference to FIG. 24).

Receiving Control Signal "Pressing of Select Button"

The DVD player 1-1 checks for a control signal at all times in the standby state. That is, at step S202, the CPU 31 checks whether the light receiving unit 36 has received a control signal. When the light receiving unit 36 has received a control signal, the processing proceeds to step S203. When the light receiving unit 36 has not received a control signal, the processing returns to step S202.

At step S203, the CPU 31 reads the received control signal. At step S204, the CPU 31 determines whether the read control signal indicates "pressing of the select button." When the read control signal indicates "pressing of the select button," the processing proceeds to step S205. When the read control signal does not indicate "pressing of the select button," the processing returns to step S202.

Ignoring Unnecessary Remote Control Commands by Recorded "Source Designation Canceling Information"

At step S205, the CPU 31 compares the remote control ID and the session ID of the read control signal with a session ID included in source designation canceling information retained by the RAM 33. When the session is not cancelled, the processing proceeds to step S206. When the session is cancelled, on the other hand, the processing returns to step S202.

Transmitting "Source-Designated Candidate Information"

In response to the reception of the control signal "pressing of the select button," the CPU 31 lights the LED display unit 37 in green at step S206. At step S207, the CPU 31 generates source-designated candidate information including a "source-designated candidate information" command, the remote control ID, the session ID, identifying information of the DVD player 1-1, the current status of the DVD player 1-1 ("power on" in this case), and a network address (such as an IP address or the like) indicating the address of the DVD player 1-1 on the network 3, and then outputs the source-designated candidate information to the network interface 35 to broadcast the source-designated candidate information via the network 3 (transmit the source-designated candidate information without specifying a destination).

Receiving the source-designated candidate information, all apparatus on the network 3 know that a candidate for a source apparatus has been specified in this session by the remote control ID and the session ID. Further, the apparatus store the source-designated candidate information transmitted by the DVD player 1-1.

At step S208, the CPU 31 clears a "source-designated candidate information reception flag" at a specific position in the RAM 33.

Checking Source-Designated Candidate Information

At step S209, the CPU 31 waits for a predetermined time, and then checks that no "source-designated candidate information" has been broadcast from another apparatus (the DVD player 1-2 or the like). The "source-designated candidate information" is received in the sub-processing; when "source-designated candidate information" is received, the sub-processing records the information in the RAM 33, and sets the "source-designated candidate information reception flag" that indicates the reception of the information.

Establishing DVD Player 1-1 Itself as Source Apparatus When No "Source-Designated Candidate Information" Has Been Broadcast from Another Apparatus (DVD Player 1-2 or the Like)

At step S210, the CPU 31 checks the "source-designated candidate information reception flag" in the RAM 33, and proceeds to step S218 when the flag is not set. In this case, no "source-designated candidate information" has been broadcast from another apparatus. It is therefore determined that the source designation has been established and thus the DVD player 1-1 is established as the source apparatus in this session specified by the remote control ID and the session ID.

Examining Information Received When "Source-Designated Candidate Information" Has Been Broadcast from Another Apparatus At step S210, when the "source-designated candidate information reception flag" is set, the processing proceeds to step S211. In this case, "source-designated candidate information" broadcast from another apparatus is received within the predetermined time. Hence, the remote control ID and the session ID included in the received "source-designated candidate information" are examined in that order.

Specifically, at step S211, the CPU 31 determines whether the remote control ID included in the "source-designated candidate information" from the other apparatus coincides with the remote control ID included in the "source-designated candidate information" generated by the DVD player 1-1. When the remote control IDs differ from each other, the processing proceeds to step S218. In this case, the "source-designated candidate information" from the other apparatus includes a different remote control ID, and may therefore be ignored. Therefore, it is determined that the source designation has been established and thus the DVD player 1-1 is established as the source apparatus in this session.

When the remote control IDs coincide with each other at step S211, the processing proceeds to step S212. At step S212, the CPU 31 determines whether the session ID included in the "source-designated candidate information" from the other apparatus coincides with the session ID included in the "source-designated candidate information" generated by the DVD player 1-1. When the session IDs are identical with each other, the processing proceeds to step S214. This situation occurs when the remote control 4 designates two or more source apparatus as a source simultaneously. It is therefore determined that the source designation has not been established in this session specified by the remote control ID and the session ID. When the session IDs are not identical with each other at step S212, the processing proceeds to step S213.

Establishing DVD Player 1-1 as Source Apparatus When Session ID of DVD Player 1-1 Is Newer At step S213, the CPU 31 compares the two session IDs with each other again. When the session ID of the DVD player 1-1 is newer (has a larger numerical value in this case), the processing proceeds to step S218. In this case, the DVD player 1-1 receives a signal in a newer session of a plurality of sessions specified by the remote control 4. It is therefore determined that the source designation has been established and thus the DVD player 1-1 is established as the source apparatus in this session specified by the remote control ID and the session ID.

Establishing Another Apparatus as Source Apparatus When Session ID of DVD Player 1-1 Is Older At step S213, when the session ID of the DVD player 1-1 is older (has a smaller numerical value in this case), the processing proceeds to step S217. In this case, the DVD player 1-1 receives a signal in an older session of a plurality of sessions specified by the remote control 4. It is therefore determined that the other apparatus is established as the source apparatus in this session specified by the remote control ID and the session ID. The processing proceeds to step S217.

When Another Apparatus (DVD Player 1-2) Is Established as Source Apparatus

At step S217, the CPU 31 turns off the LED display unit 37. The processing then returns to step S202 to go into a standby state.

In this case, "source determining information" is transmitted from the other apparatus established as the source apparatus. All the apparatus on the network, including the DVD player 1-1, receive and record the "source determining information." The DVD player 1-1 performs this in the sub-processing.

When DVD Player 1-1 Is Established as Source Apparatus Transmitting "Source Determining Information"

At step S218, since it has been determined that the DVD player 1-1 is established as the source apparatus, the CPU 31 makes the confirming sound generating unit 38 generate a beep and the LED display unit 37 blink in green. At step S219, the CPU 31 generates "source determining information" including a "source determining information" command, the remote control ID, the session ID, the identifying information of the DVD player 1-1, the status of the DVD player 1-1, and the address of the DVD player 1-1 on the network 3, and then outputs the source determining information to the network interface 35 to broadcast the source determining information via the network 3.

Receiving and Recording "Source Determining Information"

The "source determining information" can notify all the apparatus on the network 3 of the source apparatus in this session specified by the remote control ID and the session ID. The "source determining information" transmitted by the DVD player 1-1 is received and stored by the other apparatus.

Of course, the same is true of the DVD player 1-1 itself. At step S220, the CPU 31 records in the RAM 33 the establishment of the DVD player 1-1 as the source apparatus, the remote control ID, the session ID and the like. The processing then proceeds to step S221.

Transmitting "Source Designation Canceling Information"

When it is determined that source designation has not been established, the CPU 31 at step S214 turns off the LED display unit 37, then makes the confirming sound generating unit 38 generate two beeps and the LED display unit 37 blink the LED in red for a certain time.

At step S215, the CPU 31 generates "source designation canceling information" including a "source designation canceling information" command, the remote control ID, the session ID, the identifying information of the DVD player 1-1, the status of the DVD player 1-1, and the network address of the DVD player 1-1, and then outputs the source designation canceling information to the network interface 35 to broadcast the source designation canceling information via the network 3.

Receiving and Recording "Source Designation Canceling Information"

The "source designation canceling information" can notify all the apparatus on the network 3 that the source designation has been cancelled in this session specified by the remote control ID and the session ID. The "source designation canceling information" transmitted by the DVD player 1-1 is received and recorded by all the apparatus on the network 3.

At step S216, the DVD player 1-1 itself also records in the RAM 33 the cancellation of the source designation of the DVD player 1-1, the remote control ID, the session ID and the like. The recorded information is, for example, used in the processing of step S205 to ignore a signal in the session.

Operation After Establishment of DVD Player 1-1 as Source Apparatus

After being established as the source apparatus, the DVD player 1-1 monitors information communicated thereto via the network 3.

Specifically, at step S221, the CPU 31 clears a "source determining information reception flag," "reception flag," and "sink-designated candidate information reception flag" to prepare for the monitoring of the network. The flags are set in the sub-processing.

At step S222, the CPU 31 checks the "source determining information reception flag" in the RAM 33. When the flag is set, the processing proceeds to step S225. When the flag is not set, on the other hand, the processing proceeds to step S223.

At step S223, the CPU 31 checks the "sink-designated candidate information reception flag" in the RAM 33. When the flag is set, the processing proceeds to step S229. When the flag is not set, on the other hand, the processing proceeds to step S224.

At step S224, the CPU 31 checks the "reception flag" in the RAM 33. When the flag is set, the processing proceeds to step S232. When the flag is not set, on the other hand, the processing returns to step S222.

Receiving Source Determining Information

Since there is a possibility that when "source determining information" transmitted by another apparatus is received, a source apparatus has been newly determined by the remote control 4 in a new session, the DVD player 1-1 examines the remote control ID and the session ID included in the received "source determining information."

Specifically, at step S225, the CPU 31 clears the "source determining information reception flag" at a specific position in the RAM 33. At step S226, the CPU 31 determines whether the remote control ID when the source designation of the DVD player 1-1 was established coincides with the remote control ID included in the received "source determining information." When the remote control IDs differ from each other, the processing returns to step S222. When the remote control IDs coincide with each other, on the other hand, the processing proceeds to step S227.

At step S227, the CPU 31 compares the session ID when the source designation of the DVD player 1-1 was established with the session ID included in the received "source determining information." When the session ID of the received "source determining information" is older (smaller value), the processing returns to step S222. When the session ID of the received "source determining information" is newer (larger value) or identical, on the other hand, the processing proceeds to step S228. At step S228, the CPU 31 turns off the LED display unit 37. Then, the processing returns to step S202.

Thus, since the remote control ID of the received "source determining information" is identical to the remote control ID when the source designation of the DVD player 1-1 was made and the session ID of the received "source determining information" is newer than the session ID when the source designation of the DVD player 1-1 was made, the DVD player 1-1 determines that a new source has been determined and that the source designation of the DVD player 1-1 is cancelled. The DVD player 1-1 then returns to a standby state.

Receiving Sink-Designated Candidate Information

When receiving "sink-designated candidate information," the DVD player 1-1 examines the remote control ID and the session ID included in the received "sink-designated candidate information." Specifically, at step S229, the CPU 31 clears the "sink-designated candidate information reception flag" at a specific position in the RAM 33. At step S230, the CPU 31 determines whether the remote control ID and the session ID when the source designation of the DVD player 1-1 was established coincides with the remote control ID and the session ID included in the received "sink-designated candidate information." When the two data sets differ from each other, the processing returns to step S222. When the two data sets coincide with each other, on the other hand, the processing proceeds to step S231.

At step S231, the CPU 31 blinks the LED display unit 37 in green only once. At this time, the sink apparatus (television receiver, for example) also blinks in green. Thus, when the sink apparatus is being designated in the same session, the LED of the already designated source apparatus blinks in synchronization, whereby the user can be informed of the combination of the sink apparatus and the source apparatus.

"Inquiry about Specifications of Signal to Be Output," "Picture Request," and "Connection Request" Transmitted by Sink Apparatus When receiving an "inquiry about specifications of a signal to be output," a "picture request," and a "connection request" transmitted by the sink apparatus, the DVD player 1-1 performs operations in response to each of them.

Specifically, at step S232, the CPU 31 clears the "reception flag" at a specific position in the RAM 33. Further, the CPU 31 reads received information from a receiving queue at a specific position in the RAM 33.

At step S234, the CPU 31 determines whether the received information is an "inquiry about specifications of a signal to be output." When the received information is an "inquiry about specifications of a signal to be output," the processing proceeds to step S237. When the received information is not an "inquiry about specifications of a signal to be output," the processing proceeds to step S235.

At step S235, the CPU 31 determines whether the received information is a "picture request." When the received information is a "picture request," the processing proceeds to step S238. When the received information is not a "picture request," the processing proceeds to step S236.

At step S236, the CPU 31 determines whether the received information is a "connection request." When the received information is a "connection request," the processing proceeds to step S239. When the received information is not a "connection request," the processing returns to step S222.

Receiving "Inquiry about Specifications of Signal to Be Output"

When receiving an "inquiry about specifications of a signal to be output," the CPU 31 at step S237 returns output signal specifications recorded in the ROM 32. Thereafter, the processing returns to step S222.

Receiving "Picture Request"

When receiving a "picture request," the CPU 31 at step S238 reads a picture (thumbnail picture or the like) that allows the specification of AV contents data recorded on a DVD disk medium inserted in the DVD drive 39, and then transmits the picture. Thereafter, the processing returns to step S222.

Receiving "Connection Request"

When receiving a "connection request," the CPU 31 at step S239 generates a "connection acknowledgement," and then outputs the "connection acknowledgement" to the network interface 35 to transmit the "connection acknowledgement" to the corresponding sink apparatus (for example the television receiver 2-1) via the network 3.

Blinking of LED Indicating Establishment of Connection

At step S240, the CPU 31 stands by until a "synchronization signal" from the sink apparatus is received. When receiving a "synchronization signal," the CPU 31 at step S241 makes the confirming sound generating unit 38 generate two beeps and the LED display unit 37 blink in green. As a result, the user can be informed of the establishment of the connection. At this time, the LED of the sink apparatus simultaneously blinks in green.

After Establishment of Connection

After the establishment of the connection, the DVD player 1-1 constantly monitors control signals from the remote control 4. That is, the CPU 31 at step S242 stands by until the light receiving unit 36 receives a control signal from the remote control 4. When the light receiving unit 36 receives a control signal, the processing proceeds to step S243.

At step S243, the CPU 31 reads the received control signal from the light receiving unit 36. At step S244, the CPU 31 determines whether the read control signal indicates "pressing of the select button." When the read control signal indicates "pressing of the select button," the processing proceeds to step S249. When the read control signal does not indicate "pressing of the select button," the processing proceeds to step S245.

At step S249, the CPU 31 compares the remote control ID and the session ID of the read control signal with the session ID of "source designation canceling information" recorded in the RAM 33. When the session is not cancelled, the DVD player 1-1 determines that the designation of a new connection has been started, and then returns to step S206 to become a source-designated candidate. When the session is cancelled, on the other hand, the processing returns to step S242.

At step S245, the CPU 31 determines whether the read control signal indicates the "play button." When the read control signal indicates the "play button," the processing proceeds to step S246. When the read control signal does not indicate the "play button," the processing proceeds to step S247.

At step S247, the CPU 31 determines whether the read control signal indicates the "stop button." When the read control signal indicates the "stop button," the processing proceeds to step S248. When the read control signal does not indicate the "stop button," the processing returns to step S242.

At step S246, the CPU 31 performs processing for starting reproduction. Specifically, the CPU 31 gives the DVD drive 39 an instruction to start reproducing a DVD medium inserted therein, and then supplies a bit stream of read AV contents data via the buffer 40 to the network interface 35 to supply the bit stream to the sink apparatus via the network 3. Thereafter, the processing returns to step S242 to continue monitoring control signals from the remote control 4.

At step S248, the CPU 31 performs stop processing. Specifically, the CPU 31 gives the DVD drive 39 an instruction to stop, and gives the network interface 35 an instruction to stop the transmission of the bit stream. Thereafter, the processing returns to step S242 to continue monitoring control signals from the remote control 4. This concludes the description of the main processing of the DVD player 1-1.

Figure 24:
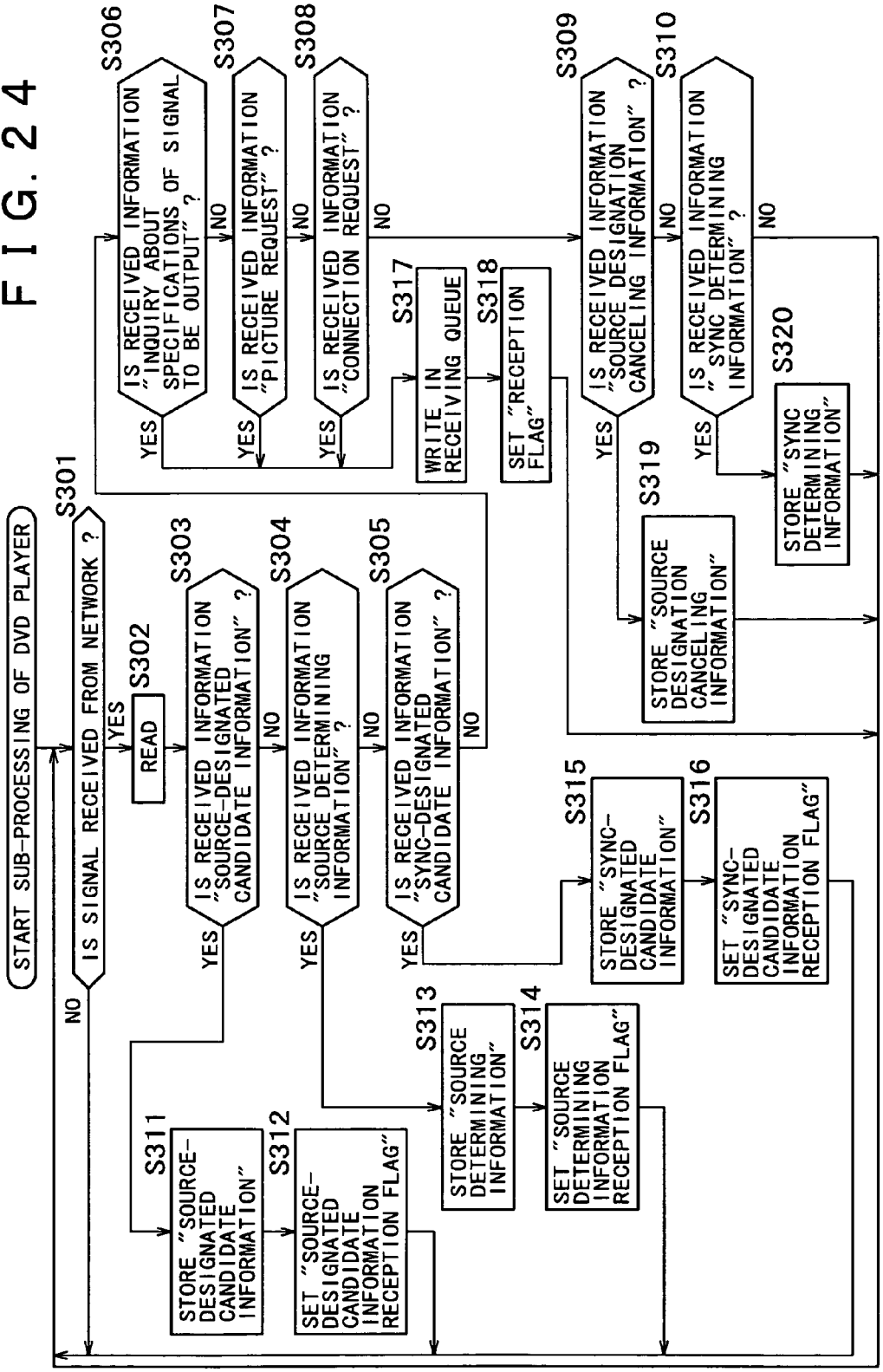
FIG. 24 is a flowchart of assistance in explaining sub-processing of the DVD player 1-1.

The sub-processing of the DVD player 1-1 will next be described with reference to FIG. 24. The sub-processing is performed in parallel with the main processing described above.

At step S301, the CPU 31 stands by until the network interface 35 receives information transmitted by another apparatus or the DVD player 1-1 itself via the network 3. When the network interface 35 receives information, the processing proceeds to step S302.

At step S302, the CPU 31 reads the received information from the network interface 35.

At step S303, the CPU 31 determines whether the received information is "source-designated candidate information." When the received information is "source-designated candidate information," the processing proceeds to step S311. When the received information is not "source-designated candidate information," the processing proceeds to step S304.

At step S304, the CPU 31 determines whether the received information is "source determining information." When the received information is "source determining information," the processing proceeds to step S313. When the received information is not "source determining information," the processing proceeds to step S305.

At step S305, the CPU 31 determines whether the received information is "sink-designated candidate information." When the received information is "sink-designated candidate information," the processing proceeds to step S315. When the received information is not "sink-designated candidate information," the processing proceeds to step S306.

At step S306, the CPU 31 determines whether the received information is an "inquiry about specifications of a signal to be output." When the received information is an "inquiry about specifications of a signal to be output," the processing proceeds to step S317. When the received information is not an "inquiry about specifications of a signal to be output," the processing proceeds to step S307.

At step S307, the CPU 31 determines whether the received information is a "picture request." When the received information is a "picture request," the processing proceeds to step S317. When the received information is not a "picture request," the processing proceeds to step S308.

At step S308, the CPU 31 determines whether the received information is a "connection request." When the received information is a "connection request," the processing proceeds to step S317. When the received information is not a "connection request," the processing proceeds to step S309.

At step S309, the CPU 31 determines whether the received information is "source designation canceling information." When the received information is "source designation canceling information," the processing proceeds to step S319. When the received information is not "source designation canceling information," the processing proceeds to step S310.

At step S310, the CPU 31 determines whether the received information is "sink determining information." When the received information is "sink determining information," the processing proceeds to step S320. When the received information is not "sink determining information," the processing returns to step S301.

At step S311, the CPU 31 writes the received "source-designated candidate information" to a specific position in the RAM 33. At step S312, the CPU 31 sets the "source-designated candidate information reception flag" at a specific position in the RAM 33. The processing then returns to step S301.

At step S313, the CPU 31 writes the received "source determining information" to a specific position in the RAM 33. At step S314, the CPU 31 sets the "source determining information reception flag" at a specific position in the RAM 33. The processing then returns to step S301.

At step S315, the CPU 31 writes the received "sink-designated candidate information" to a specific position in the RAM 33. At step S316, the CPU 31 sets the "sink-designated candidate information reception flag" at a specific position in the RAM 33. The processing then returns to step S301.

At step S317, the CPU 31 writes the information read at step S302 to the receiving queue in the RAM 33. At step S318, the CPU 31 sets the "reception flag" at a specific position in the RAM 33. The processing then returns to step S301.

At step S319, the CPU 31 writes the received "source designation canceling information" to a specific position in the RAM 33. The processing then returns to step S301.

At step S320, the CPU 31 writes the received "sink determining information" to a specific position in the RAM 33. The processing then returns to step S301.

As described above, when information is received, the newly arrived information is recorded unconditionally; however, session IDs may be compared for each remote control ID to store newer information. This concludes the description of the sub-processing of the DVD player 1-1.

The processing of the television receiver 2-1 will next be described. The processing performed by the television receiver 2-1 includes main processing for monitoring a control signal from the remote control 4 and various signals communicated thereto via the network 3 and changing status, and auxiliary sub-processing for storing the various signals in the RAM 53 when the various signals communicated thereto via the network 3 are received, and setting flags to notify the main processing of the reception. It is to be noted that the television receiver 2-2 performs similar processing; in the following description, however, the television receiver 2-2 is treated as another apparatus.

Incidentally, programs for the two types of processing performed by the CPU 51 of the television receiver 2-1 are each stored in the ROM 52, and are executed in parallel by the CPU 51.

Figure 25:
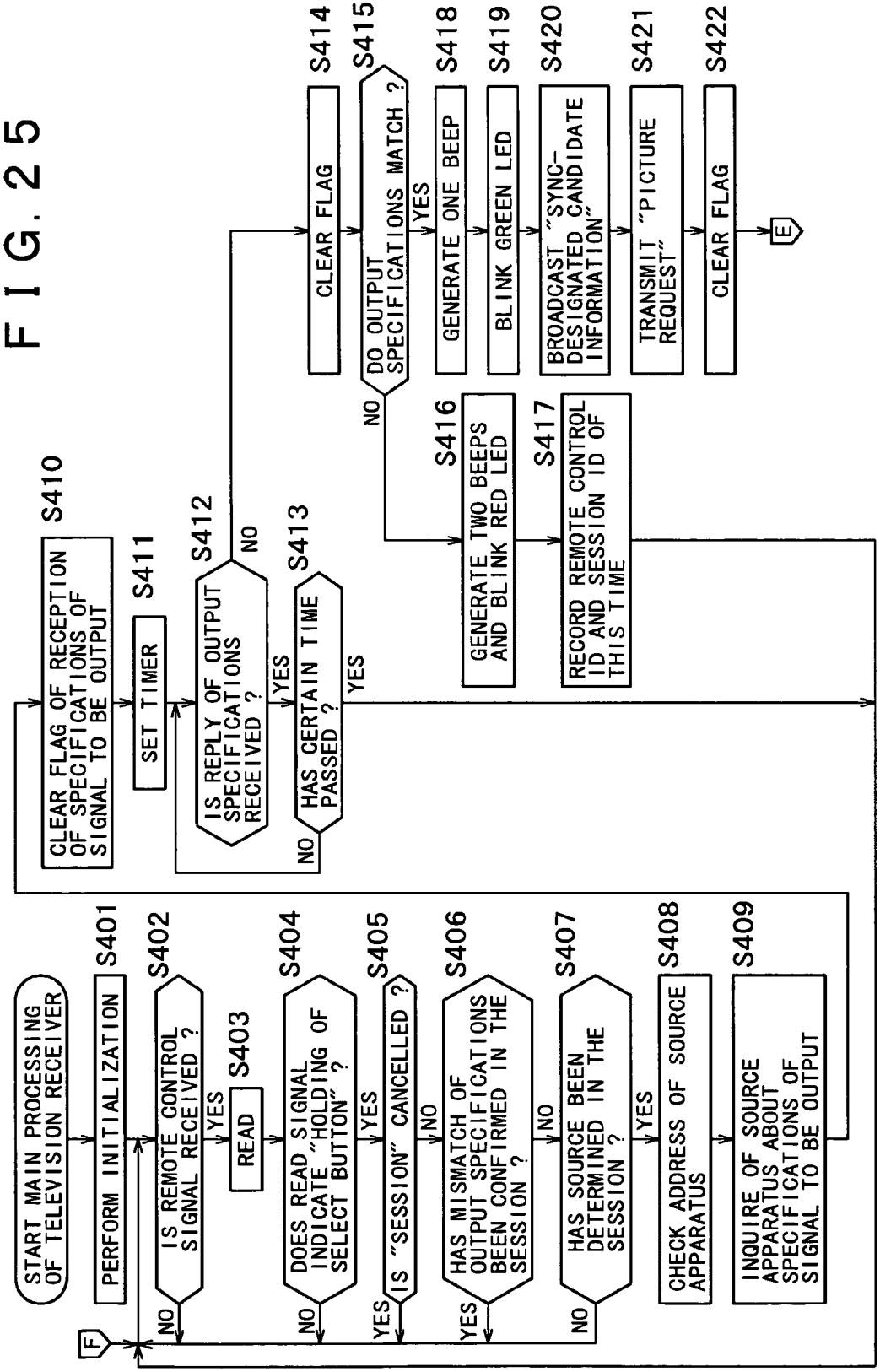
FIG. 25 is a flowchart of assistance in explaining the main processing of a television receiver 2-1.
Figure 26:
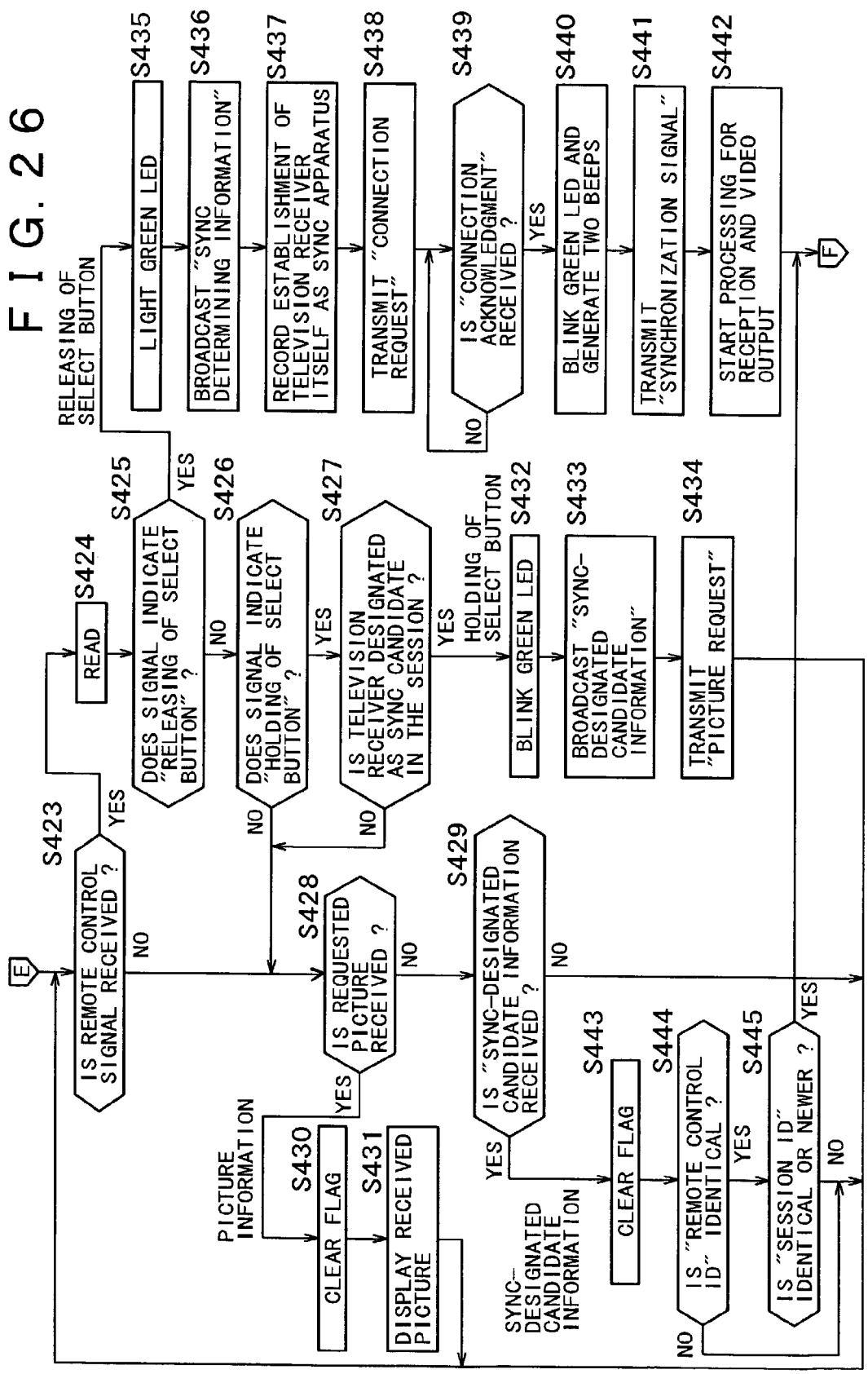
FIG. 26 is a flowchart of assistance in explaining the main processing of the television receiver 2-1.

FIG. 25 and FIG. 26 are flowcharts of assistance in explaining the main processing. At step S401, the CPU 51 performs overall initialization before going into a standby state. At the same time, the CPU 51 also starts the sub-processing (to be described later with reference to the flowchart of FIG. 27).

Standby State

Receiving Control Signal "Holding of Select Button"

The television receiver 2-1 monitors control signals from the remote control 4 at all times in the standby state. That is, at step S402, the CPU 51 stands by until the light receiving unit 56 receives a control signal. When the light receiving unit 56 receives a control signal, the processing proceeds to step S403.

At step S403, the CPU 51 reads the received control signal from the network interface 55. At step S404, the CPU 51 determines whether the read control signal indicates "holding of the select button." When the read control signal indicates "holding of the select button," the processing proceeds to step S405. When the read control signal does not indicate "holding of the select button," the processing returns to step S402.

At step S405, the CPU 51 compares the remote control ID and the session ID included in the read control signal with the remote control ID and the session ID included in the source designation canceling information recorded in the RAM 53. When the remote control IDs and the session IDs coincide with each other, it is determined that the session has been cancelled, and therefore the processing returns to step S402. When the remote control IDs and the session IDs differ from each other, the session has not been cancelled, and therefore the processing proceeds to step S406.

At step S406, the CPU 51 compares the remote control ID and the session ID included in the received control signal with the remote control ID and the session ID included in "output specification mismatch information" recorded in the RAM 53. When the remote control IDs and the session IDs coincide with each other, it has been previously determined that connection is not possible because of a mismatch of signal specifications, and therefore the processing returns to step S402. When the remote control IDs and the session IDs differ from each other, the mismatch of signal specifications is not confirmed, and therefore the processing proceeds to step S407.

At step S407, the CPU 51 compares the remote control ID and the session ID included in the received control signal with the remote control ID and the session ID included in "source determining information" recorded in the RAM 53. When the remote control IDs and the session IDs coincide with each other, it is determined that the television receiver 2-1 is designated as a sink candidate in this session, and the processing proceeds to step S408. When the remote control IDs and the session IDs differ from each other, the processing returns to step S402.

Checking for Capability

Determining that the television receiver 2-1 has been designated as a candidate for the sink apparatus, the television receiver 2-1 checks for capability of connection to the source apparatus. Specifically, at step S408, the CPU 51 reads a network address from the "source determining information"

of the session. At step S409, the CPU 51 generates an "inquiry about specifications of a signal to be output," and then outputs the inquiry to the network interface 55 to transmit the inquiry to the source apparatus via the network 3. At step S410, the CPU 51 clears a "flag of reception of specifications of a signal to be output." At step S411, the CPU 51 sets a timer included therein to a maximum time for waiting for a reply from the source apparatus to the "inquiry about specifications of a signal to be output," and then starts measurement.

At step S412, the CPU 51 determines whether there is a reply from the source apparatus to the "inquiry about specifications of a signal to be output." Specifically, the CPU 51 checks the "flag of reception of specifications of a signal to be output" in the RAM 53. When the flag is set, the CPU 51 determines that there is a reply, and proceeds to step S414. When the flag is not set, the CPU 51 determines that there is no reply yet, and proceeds to step S413.

At step S413, the CPU 51 determines whether the timer included therein has exceeded the set time. When the timer has not yet exceeded the set time, the processing returns to step S412. When the timer has exceeded the set time, the processing returns to step S402.

At step S414, the CPU 51 clears the "flag of reception of specifications of a signal to be output" at a specific position in the RAM 53. At step S415, the CPU 51 determines whether "specifications of a signal to be output" returned from the source apparatus match the specifications of a signal reproducible by the television receiver 2-1. When the specifications match, the processing proceeds to step S418. When, on the other hand, the specifications do not match, that is, when the television receiver 2-1 cannot reproduce the signal to be output, the processing proceeds to step S416.

It is conceivable as an example of the incapability of display that although the sink apparatus supports standard signal television (SD), for example, the signal to be output by the source apparatus conforms to high-definition television (HD).

Mismatch of Specifications of Signal to Be Output

At step S416, the CPU 51 blinks the LED display unit 57 in red, and makes the confirming sound generating unit 58 generate two beeps. At step S417, the CPU 51 writes this session, that is, the remote control ID and the session ID, to a specific position in the RAM 53 where "output specification mismatch information" is recorded, and then returns to step S402. The "output specification mismatch information" is used to ignore control signals in this session.

When Specifications of Signal to Be Output Match

At step S418, the CPU 51 makes the confirming sound generating unit 58 generate a beep. At step S419, the CPU 51 blinks the LED display unit 57 in green only once. At step S420, the CPU 51 generates "sink-designated candidate information" including a "sink-designated candidate information" command, remote control ID, session ID, and identifying information, status, and network address of the television receiver 2-1, and then outputs the sink-designated candidate information to the network interface 55 to broadcast the sink-designated candidate information via the network 3.

Receiving the "sink-designated candidate information," the source apparatus already designated in the same session blinks a green LED only once. Thus, when the sink apparatus is being designated in the same session, the LED of the already designated source apparatus blinks in synchronization, whereby the user can be informed of the combination of the sink apparatus and the source apparatus.

Broadcasting the "sink-designated candidate information" allows all the apparatus on the network 3 to be notified that a candidate for the sink apparatus has been designated in the session.

At step S421, the CPU 51 generates a "picture request," and then outputs the "picture request" to the network interface 55 to transmit the "picture request" to the source apparatus via the network 3. At step S422, the CPU 51 clears a "picture information reception flag" and a "sink-designated candidate information reception flag" in the RAM 53. The processing proceeds to step S423.

Sink Apparatus Candidate

The CPU 51 of the television receiver 2-1, which has become a sink apparatus candidate, determines at step S423 whether the light receiving unit 56 has received a control signal from the remote control 4. When the light receiving unit 56 has received a control signal from the remote control 4, the processing proceeds to step S424. At step S424, the CPU 51 reads the control signal received by the light receiving unit 56 from the remote control 4. At step S425, the CPU 51 determines whether the control signal indicates "releasing of the select button." When the control signal does not indicate "releasing of the select button," the processing proceeds to step S426. When the control signal indicates "releasing of the select button," the processing proceeds to step S435.

At step S426, the CPU 51 determines whether the control signal indicates "holding of the select button." When the control signal indicates "holding of the select button," the processing proceeds to step S427. When the control signal does not indicate "holding of the select button," the processing proceeds to step S428.

At step S427, the CPU 51 compares the remote control ID and the session ID of the control signal "holding of the select button" with the remote control ID and the session ID in this session in which the television receiver 2-1 has been designated as a sink candidate. When the remote control IDs and the session IDs coincide with each other, the processing proceeds to step S432. When the remote control IDs and the session IDs do not coincide with each other, the processing proceeds to step S428.

At step S428, the CPU 51 checks the "picture information reception flag" in the RAM 53 to determine whether "picture information" requested from the source apparatus has arrived. When the flag is set, the processing proceeds to step S430. When the flag is not set, the processing proceeds to step S429.

At step S429, the CPU 51 checks the "sink-designated candidate information reception flag" in the RAM 53 to determine whether "sink-designated candidate information" has been received from another apparatus. When the flag is set, the processing proceeds to step S443. When the flag is not set, the processing returns to step S423.

Reception of Sink-Designated Candidate Information

At step S443, the CPU 51 clears the "sink-designated candidate information reception flag" at a specific position in the RAM 53. At step S444, the CPU 51 compares the remote control ID when the television receiver 2-1 was designated as a sink candidate with the remote control ID included in the received "sink-designated candidate information." When the remote control IDs coincide with each other, the processing proceeds to step S445. When the remote control IDs differ from each other, the processing returns to step S423.

At step S445, the CPU 51 compares the session ID when the television receiver 2-1 was designated as a sink candidate with the session ID included in the received "sink-designated candidate information." When the received "session ID" is older (smaller value), the processing returns to step S423. When the received "session ID" is newer (larger value) or identical, the processing returns to step S402.

That is, when the remote control ID of the received "sink-designated candidate information" is identical with the remote control ID when the television receiver 2-1 was designated as a sink candidate and further the received session ID is identical with or newer than the session ID when the television receiver 2-1 was designated as a sink candidate, the television receiver 2-1 determines that a new sink apparatus candidate has been selected and that the designation of the television receiver 2-1 as a sink apparatus candidate is cancelled. The television receiver 2-1 then returns to a standby state.

Reception of Picture Information

At step S430, the CPU 51 clears the "picture information reception flag" at a specific position in the RAM 53. At step S431, the CPU 51 displays a received picture. The processing returns to step S423.

Reception of Control Signal "Holding of Select Button"

At step S432, the CPU 51 blinks the LED display unit 57 in green only once. The LED blinks in green in synchronization with the source apparatus.

At step S433, the CPU 51 generates "sink-designated candidate information" including a "sink-designated candidate information" command, the remote control ID, the session ID, and the identifying information, status, and network address of the television receiver 2-1, and then outputs the sink-designated candidate information to the network interface 55 to broadcast the sink-designated candidate information via the network 3. Receiving the "sink-designated candidate information," the source apparatus already designated in the same session blinks the green LED only once. Thus, when the sink apparatus is being designated in the same session, the LED of the already designated source apparatus blinks in synchronization, whereby the user can be informed of the combination of the sink apparatus and the source apparatus.

At step S434, the CPU 51 generates a "picture request," and then outputs the "picture request" to the network interface 55 to transmit the "picture request" to the source apparatus via the network 3. The processing thereafter returns to step S423.

Reception of Control Signal "Releasing of Select Button"

At step S435, the CPU 51 lights the LED display unit 57 in green. At step S436, the CPU 51 generates "sink determining information" including a "sink determining information" command, the remote control ID, the session ID, and the identifying information, status, and network address of the television receiver 2-1, and then outputs the sink determining information to the network interface 55 to broadcast the sink determining information via the network 3.

Of course, the television receiver 2-1 itself receives the information at step S437, and then records in the RAM 53 the establishment of the television receiver 2-1 itself as the sink apparatus, the remote control ID, the session ID and the like.

The television receiver 2-1 thereby is established as the sink apparatus. Then connection is established. Specifically, at step S438, the CPU 51 generates a "connection request," and then outputs the "connection request" to the network interface 55 to transmit the "connection request" to the source apparatus via the network 3. At step S439, the CPU 51 stands by until a "connection acknowledgement" is returned from the source apparatus. When a "connection acknowledgement" is received, the processing proceeds to step S440.

At step S440, the CPU 51 blinks the LED display unit 57 in green and makes the confirming sound generating unit 58 generate two beeps. At step S441, the CPU 51 generates a "synchronization signal," and then outputs the "synchronization signal" to the network interface 55 to transmit the "synchronization signal" to the source apparatus via the network 3.

Thereafter, at step S442, the CPU 51 makes each part start preparing for reproduction of a bit stream supplied from the source apparatus. For example, the CPU 51 instructs the network interface 55 to supply the bit stream from the source apparatus to the buffer 59 when the bit stream is received. The processing thereafter returns to step S402.

It is to be noted that while in the present embodiment, the television receiver 2-1 is established as the sink apparatus when a control signal "releasing of the select button" emitted from the remote control 4 is received, the television receiver 2-1 can be established as the sink apparatus when receiving a control signal "holding of the select button" continually over a certain time.

Thereafter, a bit stream supplied from the source apparatus is received by the network interface 55, and then input to the demultiplexer 60 via the buffer 59. The demultiplexer 60 inputs an audio stream to the audio decoder 61, and a video stream to the video decoder 63. The audio decoder 61 decodes the audio stream input thereto, and then outputs the result to the speaker 62. The video decoder 63 decodes the video stream input thereto, and then outputs the result to the mixer 65. A video signal on which OSD data is superimposed by the mixer 65 is output to the display unit 66. Finally, audio is output from the speaker 62, and video is displayed on the display unit 66. This concludes the description of the main processing of the television receiver 2-1.

The sub-processing of the television receiver 2-1 will next be described with reference to FIG. 27. The sub-processing is performed in parallel with the main processing described above.

At step S501, the CPU 51 stands by until the network interface 55 receives information via the network 3. When the network interface 55 receives information, the processing proceeds to step S502. At step S502, the CPU 51 reads the information received by the network interface 55.

At step S503, the CPU 51 determines whether the read information is "specifications of a signal to be output." When the read information is "specifications of a signal to be output," the processing proceeds to step S509. When the read information is not "specifications of a signal to be output," the processing proceeds to step S504.

At step S504, the CPU 51 determines whether the read information is "picture information." When the read information is "picture information," the processing proceeds to step S511. When the read information is not "picture information," the processing proceeds to step S505.

At step S505, the CPU 51 determines whether the read information is "source designation canceling information." When the read information is "source designation canceling information," the processing proceeds to step S513. When the read information is not "source designation canceling information," the processing proceeds to step S506.

At step S506, the CPU 51 determines whether the read information is "source determining information." When the read information is "source determining information," the processing proceeds to step S514. When the read information is not "source determining information," the processing proceeds to step S507.

At step S507, the CPU 51 determines whether the read information is "sink-designated candidate information."

When the read information is "sink-designated candidate information," the processing proceeds to step S515. When the read information is not "sink-designated candidate information," the processing proceeds to step S508.

At step S508, the CPU 51 determines whether the read information is a bit stream supplied from the source apparatus. When the read information is a bit stream, the processing proceeds to step S517. When the read information is not a bit stream, the processing returns to step S501.

At step S509, the CPU 51 writes the read "specifications of a signal to be output" to a specific position in the RAM 53. At step S510, the CPU 51 sets the "flag of reception of specifications of a signal to be output" at a specific position in the RAM 53. The processing thereafter returns to step S501.

At step S511, the CPU 51 writes the read "picture information" to a specific position in the RAM 53. At step S512, the CPU 51 sets the "picture information reception flag" at a specific position in the RAM 53. The processing thereafter returns to step S501.

At step S513, the CPU 51 writes the read "source designation canceling information" to a specific position in the RAM 53. The processing thereafter returns to step S501.

At step S514, the CPU 51 writes the read "source determining information" to a specific position in the RAM 53. The processing thereafter returns to step S501.

At step S515, the CPU 51 writes the read "sink-designated candidate information" to a specific position in the RAM 53. At step S516, the CPU 51 sets the "sink-designated candidate information reception flag" at a specific position in the RAM 53. The processing thereafter returns to step S501.

At step S517, the CPU 51 supplies the bit stream received by the network interface 55 to the buffer 59 via the system bus 54. The processing thereafter returns to step S501.

As described above, when all information other than a bit stream is received, the newly arrived information is recorded unconditionally; however, session IDs may be compared for each remote control ID to store newer information. This concludes the description of the sub-processing of the television receiver 2-1.

As described above, with the AV network system to which the present invention is applied, it is possible to designate the source apparatus and the sink apparatus only by depressing the select button 76B with the remote control 4 directed to an AV apparatus desired to be designated as a source apparatus among a plurality of AV apparatus included in the network, directing the remote control 4 to an AV apparatus desired to be designated as a sink apparatus while continuing the depression of the select button 76B, and then releasing the depression of the select button 76B.

Being able to be performed intuitively, this operation is highly convenient for users accustomed to drag-and-drop operation by a mouse, or an operating device of a personal computer.

It is to be noted that while in the present embodiment, description has been made of transmission of AV contents data via the AV network system, the present invention is, of course, applicable to transmission of only audio contents data or only video contents data.

Also, the AV network system can be connected with AV apparatus, such as a speaker system, a display and the like, personal computers and the like, as well as DVD players and television receivers.

Further, while in the present embodiment, contents data processing apparatus (for example, DVD players and television receivers) autonomously operate under operating programs independent of each other, the present invention may of course be embodied in a client-server system operated with one master controller (server) and a plurality of clients or a system having a plurality of servers as a derivative of the client-server system.

In the first system, a master controller (control apparatus) exists in addition to DVD players and television receivers. Remote control signals received by the DVD players and television receivers are sent to the master controller as they are. The master controller determines the reaction of each of the apparatus according to the status of the DVD players and television receivers and a received remote control signal, and then returns a command to the DVD players and television receivers. The DVD players and television receivers operate according to the command supplied from the master controller. In this case, the master controller also performs comparison of output signal specifications and the like.

In the second system, a television receiver, for example, undertakes control of a DVD player. In this case, the television receiver is a server and the DVD player is a client. A remote control signal received by the DVD player is supplied to the television receiver. The television receiver responds in accordance with the status of the television receiver, a remote control signal received by the television receiver, and information from the network. In addition, the television receiver determines the operation to be performed by the DVD player on behalf of the DVD player according to the remote control signal received by the DVD player and information from the network, and then returns a command to the DVD player.

It is to be noted that in the present specification, the steps describing the programs recorded on recording media include not only processing carried out in time series in the described order but also processing carried out in parallel or individually and not necessarily in time series.

Also, in the present specification, a system refers to an apparatus as a whole formed by a plurality of apparatus.

As described above, according to the present invention, it is possible to realize an AV network system that allows a source apparatus and a sink apparatus for receiving AV contents data supplied by the source apparatus to be selected by intuitive operation using a remote control.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A communication apparatus for communicating data via a network, comprising:
   a detecting unit operable to detect a control signal having a first portion, a middle portion, and a last portion;
   a transmitter operable to transmit a signal to another communication apparatus via the network;
   a receiving unit operable to receive a signal transmitted by the another communication apparatus via the network; and
   a setting unit operable to set said communication apparatus as a source apparatus in a source mode or as a sink apparatus in a sink mode;
   in said source mode, when said detecting unit detects said first portion of said control signal, said transmitter transmits a source apparatus candidate signal indicating that said communication apparatus is selected as a candidate for said source apparatus, and thereafter when said receiving unit does not receive a source apparatus candidate signal transmitted by the another communication apparatus within a predetermined time, said transmitter transmits a source apparatus determining signal indicating that said communication apparatus is established as said source apparatus, and said setting unit sets said communication apparatus as said source apparatus; and in said sink mode, when said detecting unit detects said middle portion of said control signal after said receiving unit receives a source apparatus determining signal transmitted by the another communication apparatus, said transmitter transmits a sink apparatus candidate signal indicating that said communication apparatus is selected as a candidate for said sink apparatus, and thereafter when said detecting unit detects said last portion of said control signal, said transmitter transmits a sink apparatus determining signal indicating that said communication apparatus is established as said sink apparatus, and said setting unit sets said communication apparatus as said sink apparatus.

2. A method by which a communication apparatus communicates data via a network, the method comprising:

detecting a control signal having a first portion, a middle portion, and a last portion;

transmitting a signal to another communication apparatus via the network;

receiving a signal transmitted by the another communication apparatus via the network; and setting the communication apparatus as a source apparatus in a source mode or as a sink apparatus in a sink mode;

in the source mode, when the detecting step detects the first portion of the control signal, the transmitting step transmits a source apparatus candidate signal indicating that the communication apparatus is selected as a candidate for the source apparatus, and thereafter when the receiving step does not receive a source apparatus candidate signal transmitted by the another communication apparatus within a predetermined time, the transmitting step transmits a source apparatus determining signal indicating that the communication apparatus is established as the source apparatus, and the setting step sets the communication apparatus as the source apparatus; and in the sink mode, when the detecting step detects the middle portion of the control signal after the receiving step receives a source apparatus determining signal transmitted by the another communication apparatus, the transmitting step transmits a sink apparatus candidate signal indicating that the communication apparatus is selected as a candidate for the sink apparatus, and thereafter when the detecting step detects the last portion of the control signal, the transmitting step transmits a sink apparatus determining signal indicating that the communication apparatus is established as the sink apparatus, and the setting step sets the communication apparatus as the sink apparatus.

3. A recording medium recorded with a computer readable program for causing a communication apparatus to communicate data via a network, the program comprising:

detecting a control signal having a first portion, a middle portion, and a last portion;

transmitting a signal to another communication apparatus via the network;

receiving a signal transmitted by the another communication apparatus via the network; and setting the communication apparatus as a source apparatus in a source mode or as a sink apparatus in a sink mode;

in the source mode, when the detecting step detects the first portion of the control signal, the transmitting step transmits a source apparatus candidate signal indicating that the communication apparatus is selected as a candidate for the source apparatus, and thereafter when the receiving step does not receive a source apparatus candidate signal transmitted by the another communication apparatus within a predetermined time, the transmitting step transmits a source apparatus determining signal indicating that the communication apparatus is established as the source apparatus, and the setting step sets the communication apparatus as the source apparatus; and in the sink mode, when the detecting step detects the middle portion of the control signal after the receiving step receives a source apparatus determining signal transmitted by the another communication apparatus, the transmitting step transmits a sink apparatus candidate signal indicating that the communication apparatus is selected as a candidate for the sink apparatus, and thereafter when the detecting step detects the last portion of the control signal, the transmitting step transmits a sink apparatus determining signal indicating that the communication apparatus is established as the sink apparatus, and the setting step sets the communication apparatus as the sink apparatus.

4. A system in which a communication apparatus communicates data via a network, the system comprising:

a processor operable to execute instructions; and instructions, the instructions including:

detecting a control signal having a first portion, a middle portion, and a last portion;

transmitting a signal to another communication apparatus via the network;

receiving a signal transmitted by the another communication apparatus via the network; and setting the communication apparatus as a source apparatus in a source mode or as a sink apparatus in a sink mode;

in the source mode, when the detecting step detects the first portion of the control signal, the transmitting step transmits a source apparatus candidate signal indicating that the communication apparatus is selected as a candidate for the source apparatus, and thereafter when the receiving step does not receive a source apparatus candidate signal transmitted by the another communication apparatus within a predetermined time, the transmitting step transmits a source apparatus determining signal indicating that the communication apparatus is established as the source apparatus, and the setting step sets the communication apparatus as the source apparatus; and in the sink mode, when the detecting step detects the middle portion of the control signal after the receiving step receives a source apparatus determining signal transmitted by the another communication apparatus, the transmitting step transmits a sink apparatus candidate signal indicating that the communication apparatus is selected as a candidate for the sink apparatus, and thereafter when the detecting step detects the last portion of the control signal, the transmitting step transmits a sink apparatus determining signal indicating that the communication apparatus is established as the sink apparatus, and the setting step sets the communication apparatus as the sink apparatus.

5. A communication apparatus for transmitting data via a network, comprising:

a detecting unit operable to detect a control signal having a first portion, a middle portion, and a last portion;

a transmitter operable to transmit a signal to another communication apparatus via the network;

a receiving unit operable to receive a signal transmitted by the another communication apparatus via the network; and a setting unit operable to set the communication apparatus as a source apparatus;

wherein when said detecting unit detects said first portion of said control signal, said transmitter transmits a source apparatus candidate signal indicating that said communication apparatus is selected as a candidate for said source apparatus, and thereafter when said receiving unit does not receive a source apparatus candidate signal transmitted by the another communication apparatus within a predetermined time, said transmitter transmits a source apparatus determining signal indicating that said communication apparatus is established as said source apparatus, and said setting unit sets said communication apparatus as said source apparatus.

6. A method by which a communication apparatus transmits data via a network, the method comprising:

detecting a control signal having a start portion, a middle portion, and a last portion;

transmitting a signal to another communication apparatus via the network;

receiving a signal transmitted by the another communication apparatus via the network; and setting the communication apparatus as a source apparatus;

wherein when the detecting step detects the first portion of the control signal, the transmitting step transmits a source apparatus candidate signal indicating that the communication apparatus is selected as a candidate for the source apparatus, and thereafter when the receiving step does not receive a source apparatus candidate signal transmitted by the another communication apparatus within a predetermined time, the transmitting step transmits a source apparatus determining signal indicating that the communication apparatus is established as the source apparatus, and the setting step sets the communication apparatus as the source apparatus.

7. A recording medium recorded with a computer readable program for causing a communication apparatus to transmit data via a network, the program comprising:

detecting a control signal having a first portion, a middle portion, and a last portion;

transmitting a signal to another communication apparatus via the network;

receiving a signal transmitted by the another communication apparatus via the network; and setting the communication apparatus as a source apparatus;

wherein when the detecting step detects the first portion of the control signal, the transmitting step transmits a source apparatus candidate signal indicating that the communication apparatus is selected as a candidate for the source apparatus, and thereafter when the receiving step does not receive a source apparatus candidate signal transmitted by the another communication apparatus within a predetermined time, the transmitting step transmits a source apparatus determining signal indicating that the communication apparatus is established as the source apparatus, and the setting step sets the communication apparatus as the source apparatus.

8. A system in which a communication apparatus transmits data via a network, the system comprising:

a processor operable to execute instructions; and
instructions, the instructions including:
detecting a control signal having a first portion, a middle portion, and a last portion;

transmitting a signal to another communication apparatus via the network;

receiving a signal transmitted by the another communication apparatus via the network; and setting the communication apparatus as a source apparatus;

wherein when the detecting step detects the first portion of the control signal, the transmitting step transmits a source apparatus candidate signal indicating that the communication apparatus is selected as a candidate for the source apparatus, and thereafter when the receiving step does not receive a source apparatus candidate signal transmitted by the another communication apparatus within a predetermined time, the transmitting step transmits a source apparatus determining signal indicating that the communication apparatus is established as the source apparatus, and the setting step sets the communication apparatus as the source apparatus.

9. A communication apparatus for receiving data via a network, comprising:

a detecting unit operable to detect a control signal having a first portion, a middle portion, and a last portion;

a transmitter operable to transmit a signal to another communication apparatus via the network;

a receiving unit operable to receive a signal transmitted by the another communication apparatus via the network; and a setting unit operable to set said communication apparatus as a sink apparatus;

wherein when said detecting unit detects said middle portion of said control signal after said receiving unit receives a source apparatus determining signal transmitted by the another communication apparatus, said transmitter transmits a sink apparatus candidate signal indicating that said communication apparatus is selected as a candidate for said sink apparatus, and thereafter when said detecting unit detects said last portion of said control signal, said transmitter transmits a sink apparatus determining signal indicating that said communication apparatus is established as said sink apparatus, and said setting unit sets said communication apparatus as said sink apparatus.

10. A method by which a communication apparatus receives data via a network, the method comprising:

detecting a control signal having a first portion, a middle portion, and a last portion;

transmitting a signal to another communication apparatus via the network;

receiving a signal transmitted by the another communication apparatus via the network; and setting the communication apparatus as a sink apparatus;

wherein when the detecting step detects the middle portion of the control signal after the receiving step receives a source apparatus determining signal transmitted by the another communication apparatus, the transmitting step transmits a sink apparatus candidate signal indicating that the communication apparatus is selected as a candidate for the sink apparatus, and thereafter when the detecting step detects the last portion of the control signal, the transmitting step transmits a sink apparatus determining signal indicating that the communication apparatus is established as the sink apparatus, and the setting step sets the communication apparatus as the sink apparatus.

11. A recording medium recorded with a computer readable program for causing a communication apparatus to receive data via a network, the program comprising:

detecting a control signal having a first portion, a middle portion, and a last portion;
transmitting a signal to another communication apparatus via the network;
receiving a signal transmitted by the another communication apparatus via the network; and
setting the communication apparatus as a sink apparatus;
wherein when the detecting step detects the middle portion of the control signal after the receiving step receives a source apparatus determining signal transmitted by the another communication apparatus, the transmitting step transmits a sink apparatus candidate signal indicating that the communication apparatus is selected as a candidate for the sink apparatus, and thereafter when the detecting step detects the last portion of the control signal, the transmitting step transmits a sink apparatus determining signal indicating that the communication apparatus is established as the sink apparatus, and the setting step sets the communication apparatus as the sink apparatus.

12. A system in which a communication apparatus receives data via a network, the system comprising:
a processor operable to execute instructions; and
instructions, the instructions including:
detecting a control signal having a first portion, a middle portion, and a last portion;
transmitting a signal to another communication apparatus via the network;
receiving a signal transmitted by the another communication apparatus via the network; and
setting the communication apparatus as a sink apparatus;
wherein when the detecting step detects the middle portion of the control signal after the receiving step receives a source apparatus determining signal transmitted by the another communication apparatus, the transmitting step transmits a sink apparatus candidate signal indicating that the communication apparatus is selected as a candidate for the sink apparatus, and thereafter when the detecting step detects the last portion of the control signal, the transmitting step transmits a sink apparatus determining signal indicating that the communication apparatus is established as the sink apparatus, and the setting step sets the communication apparatus as the sink apparatus.

* * * * *